United States Patent
Schlegel et al.

(10) Patent No.: US 11,700,024 B2
(45) Date of Patent: Jul. 11, 2023

(54) SYSTEM AND METHOD IMPLEMENTING EXCISION CANCELLATION TECHNOLOGY

(71) Applicant: L3Harris Technologies, Inc., Melbourne, FL (US)

(72) Inventors: Christian B. Schlegel, Park City, UT (US); L Andrew Gibson, Riverton, UT (US); David G. Landon, Bountiful, UT (US); Alexander Kimani, Grantsville, UT (US)

(73) Assignee: L3 HARRIS TECHNOLOGIES, INC., Melbourne, FL (US)

( * ) Notice: Subject to any disclaimer, the term of this patent is extended or adjusted under 35 U.S.C. 154(b) by 21 days.

(21) Appl. No.: 17/372,207

(22) Filed: Jul. 9, 2021

(65) Prior Publication Data
US 2023/0010703 A1    Jan. 12, 2023

(51) Int. Cl.
*H04B 1/04* (2006.01)
*H04B 1/00* (2006.01)
*H04B 1/16* (2006.01)
*H04B 7/08* (2006.01)

(52) U.S. Cl.
CPC ......... *H04B 1/0078* (2013.01); *H04B 1/0475* (2013.01); *H04B 1/1615* (2013.01); *H04B 7/0877* (2013.01)

(58) Field of Classification Search
CPC .. H04B 1/0078; H04B 7/0871; H04B 7/0874; H04B 1/0035; H04B 7/0877; H04B 1/0042; H04B 1/16; H04B 1/04
USPC ........................................ 375/262, 340, 350
See application file for complete search history.

(56) References Cited

U.S. PATENT DOCUMENTS

| | | | |
|---|---|---|---|
| 6,188,718 B1 | 2/2001 | Gitlin et al. | |
| 6,804,309 B1 | 10/2004 | Morelos-Zaragoza | |
| 7,567,635 B2 | 7/2009 | Scheim et al. | |
| 8,433,015 B2 | 4/2013 | Downey et al. | |
| 8,929,492 B2 | 1/2015 | Downey et al. | |
| 9,197,360 B2 | 11/2015 | Wyckoff | |
| 9,197,461 B1 * | 11/2015 | Sun ........................ | H04B 7/024 |
| 9,391,654 B2 | 7/2016 | Wyckoff et al. | |

(Continued)

FOREIGN PATENT DOCUMENTS

| | | |
|---|---|---|
| CN | 104507106 A | 4/2015 |
| CN | 103532894 B | 4/2017 |

OTHER PUBLICATIONS

Feng et al., "An Accurate Modulation Recognition Method of QPSK Signal," Advanced Techniques for Computational and Information Sciences, Mathematical Problems in Engineering, vol. 2015, Article ID 516081, 7 pages (2015).

(Continued)

*Primary Examiner* — Emmanuel Bayard
(74) *Attorney, Agent, or Firm* — Fox Rothschild LLP

(57) ABSTRACT

Systems and methods for mitigating an effect interference. The methods comprise: receiving, by a device, a signal comprising a plurality of signal components; determining whether each signal component has a sufficient reconstructability; reconstructing each said signal component that was determined to have sufficient reconstructability using the received signal or an at least partially clean signal with other signal component(s) removed from the received signal; and using the reconstructed signal components to generate a modified received comprising the received signal with the signal components removed therefrom that (i) are devoid of a signal of interest and (ii) have sufficient reconstructability.

28 Claims, 21 Drawing Sheets

(56) References Cited

U.S. PATENT DOCUMENTS

| | | | |
|---|---|---|---|
| 9,537,521 B2 | 1/2017 | Downey et al. | |
| 9,537,689 B2 | 1/2017 | Zhou et al. | |
| 9,794,092 B1 | 10/2017 | Isautier et al. | |
| 2005/0213556 A1* | 9/2005 | Wax | H04L 1/06 370/349 |
| 2006/0245509 A1* | 11/2006 | Khan | H04B 7/0684 375/260 |
| 2009/0257477 A1* | 10/2009 | Khayrallah | H04B 1/7105 375/232 |
| 2012/0189083 A1* | 7/2012 | Reial | H04B 1/1027 375/340 |
| 2014/0044107 A1* | 2/2014 | Jacob | H04L 5/12 370/336 |
| 2014/0198688 A1* | 7/2014 | Li | H04B 1/525 370/278 |
| 2015/0188573 A1* | 7/2015 | Lorca Hernando | H03M 13/258 714/776 |
| 2015/0222391 A1* | 8/2015 | Webster | H04L 1/0048 370/329 |
| 2016/0315754 A1* | 10/2016 | Wu | H04L 5/0062 |

OTHER PUBLICATIONS

Hazza et al., "An Overview of Feature-Based Methods for Digital Modulation Classification," 2013 1st International Conference on Communications, Signal Processing, and their Applications (ICCSPA) 6 pages (2013).

Ramkumar, "Automatic modulation classification for cognitive radios using cyclic feature detection," IEEE Circuits and Systems Magazine, 9(2), pp. 27-45 (2009).

Young Jin Chun et al., "Log-likelihood-ratio ordered successive interference cancellation in multi-user, multi-mode MIMO systems," IEEE Communications Letters, 11(11), pp. 837-839 (2008).

Extended European Search Report dated Dec. 7, 2022 in corresponding European Patent Application No. 22183764 (8 pages).

* cited by examiner

SYSTEM AND METHOD IMPLEMENTING EXCISION CANCELLATION TECHNOLOGY

BACKGROUND

Statement of the Technical Field

The present document concerns communication systems. More specifically, the present document concerns systems and methods implementing excision and cancellation technology.

Description of the Related Art

There are many communication devices known in the art. Such communication devices include, but are not limited to, satellite communication devices and/or radios. The communication devices may experience interference resulting from other communication signals. This interference can degrade performance of the communication devices.

SUMMARY

This document concerns systems and methods for mitigating the effect of interference. The methods comprise: receiving, by a device, a signal comprising a plurality of signal components; determining, by the device, whether each said signal component has a sufficient reconstructability; reconstructing each said signal component which was determined to have the sufficient reconstructability using the received signal or an at least partially clean signal with one or more other signal components (e.g., a signal of interest and/or an interfering signal) removed from the received signal; and using at least some of the reconstructed signals to generate a modified received signal comprising the received signal with the signal components removed therefrom that (i) are devoid of any signal of interest components and (ii) have sufficient reconstructability.

The methods may also comprise: obtaining power levels for each signal component of the plurality of signal components; ranking the plurality of signal components based on the power levels; and assigning the plurality of signal components to a plurality of signal extractors based on the ranking.

The methods may also comprise: obtaining power levels and bandwidth for each signal component of the plurality of signal components; ranking the plurality of signal components based on the power-spectral density levels; and assigning the plurality of signal components to a plurality of signal extractors based on the ranking.

In some scenarios, the sufficiency of reconstructability for each signal component is determined based on at least one of a signal-to-noise ratio, a signal power and a modulation type. For example, each signal component is determined to have sufficient reconstructability when the signal-to-noise ratio or the signal power is greater than a threshold value. In contrast, each signal component is determined to have insufficient reconstructability when the signal-to-noise ratio or the signal power is less than a threshold value. Additionally or alternatively, the other signal component(s) is (are) removed from the received using soft symbol estimations.

In some scenarios, the methods further comprise: selecting, by the device, switches a first set of switches based on results of said determining; sequentially closing the selected switches of the first set so that each said signal component is reconstructed from the received signal or the at least partially clean signal; selecting, by the device, switches of a second set of switches based on which signal component comprises the signal of interest; and/or sequentially closing the selected switches of the second set of switches to generate the modified received signal. The selected switches of the second set may be associated with signal components other than the signal component comprising the signal of interest.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

Figure 1:
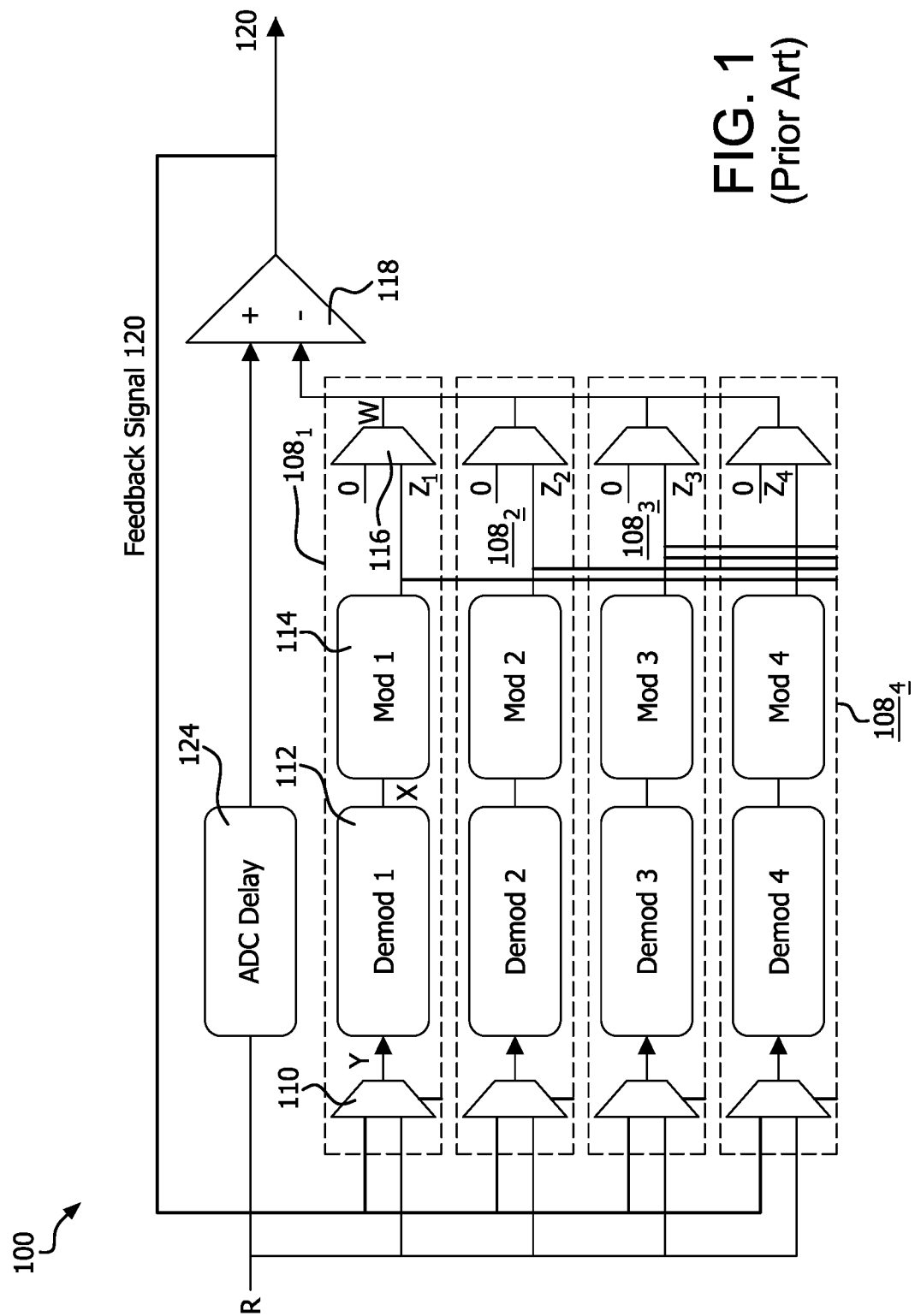
FIG. 1 is an illustration of an architecture for a conventional interference cancellation device. During operations of the conventional interference cancellation device, signals are either removed in parallel or via feedback.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Interference cancellation tools are generally limited in their ability to perform effective excision of interference with power levels similar to the Signal Of Interest (SOI). The region where the interferer cannot be effectively excised, defined as a the ratio of interferer power to SOI power, is called the deadzone. By updating existing excision tool sets in a modular core with novel algorithms and architectures of the present solution, the deadzone can be reduced or altogether eliminated. In some scenarios, signals are removed at similar power levels to the SOI with the deadzone of 2 dB or less.

The present solution provides systems and methods for mitigating the effect of interference. The methods comprise: receiving, by a device, a signal comprising a plurality of signal components; determining, by the device, whether each said signal component has a sufficient reconstructability; reconstructing each said signal component which was determined to have the sufficient reconstructability using the received signal or an at least partially clean signal with one or more other signal components (e.g., a signal of interest and/or an interfering signal) removed from the received signal; and using at least some of the reconstructed signals to generate a modified received signal comprising the received signal with the signal components removed therefrom that (i) are devoid of any signal of interest components and (ii) have sufficient reconstructability.

The methods may also comprise: obtaining power levels for each signal component of the plurality of signal components; ranking the plurality of signal components based on the power levels; and assigning the plurality of signal components to a plurality of signal extractors based on the ranking. Additionally or alternatively, the methods comprise: obtaining power levels and bandwidth for each signal component of the plurality of signal components; ranking the plurality of signal components based on the power-spectral density levels; and assigning the plurality of signal components to a plurality of signal extractors based on the ranking.

In some scenarios, the sufficiency of reconstructability for each signal component is determined based on at least one of a signal-to-noise ratio, a signal power and a modulation type. For example, each signal component is determined to have sufficient reconstructability when the signal-to-noise ratio or the signal power is greater than a threshold value. In contrast, each signal component is determined to have insufficient reconstructability when the signal-to-noise ratio or the signal power is less than a threshold value. Additionally or alternatively, the other signal component(s) is (are) removed from the received using soft symbol estimations.

In some scenarios, the methods may further comprise: selecting, by the device, switches a first set of switches based on results of said determining; sequentially closing the selected switches of the first set so that each said signal component is reconstructed from the received signal or the at least partially clean signal; selecting, by the device, switches of a second set of switches based on which signal component comprises the signal of interest; and/or sequentially closing the selected switches of the second set of switches to generate the modified received signal. The selected switches of the second set may be associated with signal components other than the signal component comprising the signal of interest.

An illustrative architecture 100 for a conventional interference cancellation device is shown in FIG. 1. Device 100 is generally configured to cancel or otherwise remove undesired signals from a received signal R so as to obtain an SOI. The undesired signals can include, but are not limited to, signals which unintentionally and/or intentionally introduce interference into a communication channel (e.g., a satellite communication channel). The desired and undesired signals overlap each other, and thus simply filtering the undesired signals cannot isolate the desired signal. Instead, the undesired signals must be extracted or otherwise removed from the received signal R to obtain the desired signal.

During operations, the received signal R is provided to the interference cancellation device 100. The interference cancellation device 100 performs operations to identify and reproduce each interfering component signal $Z_1$, $Z_2$, $Z_3$, $Z_4$ contained in the received signal R. The interfering component signals can include, but are not limited to, noise signal(s) and/or structured signal(s) (e.g., non-intentional interfering communication signals and/or jamming signals that intentionally introduce interference into a communication channel). These operations are implemented via a plurality of parallel Demodulator-Remodulator (D-R) engines $108_1$, $108_2$, $108_3$, $108_4$ (collectively referred to herein as "108"). Each D-R engine is generally configured to demodulate the interfering component signal (with relatively strong power levels), and reconstruct the interfering component signal would look like if it had not been overlapping the other component signals.

Each D-R engine comprises a demodulator 112 and a modulator 114. A signal Y is provided as an input to the demodulator 112. The signal Y can include the received signal R or an already processed feedback signal 120. In the feedback scenarios, the D-R engines operate in a sequential manner such that component signals $Z_1$, $Z_2$, $Z_3$ and $Z_4$ are recursively extracted from the received signal R. As such, the input to the first D-R engine $108_1$ is R, while the input to the second D-R engine $108_2$ is $R-Z_1$. The input to the third D-R engine $108_3$ is $R-Z_1-Z_2$. The input to the fourth D-R engine $108_4$ is $R-Z_1-Z_2-Z_3$. Multiplexers 110, 116, 118 facilitate this recursive signal extraction process. The SOI 120 is obtained and output once all component signal $Z_1$-$Z_4$ have been subtracted or otherwise removed from the received signal R.

Demodulators and modulators are well known. Still, it should be understood that demodulator 112 comprises an electronic circuit and/or computer program that is (are) configured to separate information that was modulated onto a carrier wave from the carrier wave itself. The output hard symbol decisions X of the demodulator 112 is passed to the modulator 114. The modulator 114 performs operations to vary one or more properties of a waveform using the hard symbol decisions X to produce a waveform $Z_1$, $Z_2$, $Z_3$ or $Z_4$. The waveform $Z_1$, $Z_2$, $Z_3$ or $Z_4$ is passed to a multiplexer 118, where it is subtracted or otherwise removed from the received signal R.

Notably, the above described conventional interference cancellation device 100 suffers from certain drawbacks. For example, the interference cancellation device 100 is unable to extract interference components from a received signal which have power levels similar to and/or lower than that of the SOI. Thus, the present solution was derived to address this drawback (e.g., remove undesired signals with relatively low power levels). Specifically, the present solution is designed to reduce the deadzone by implementing architectural changes and algorithm changes within an interference cancellation device. The architectural changes include a dual bus or serial architecture, and the algorithm changes involve replacing hard symbol decision operations of the demodulators with soft symbol decision operations.

The dual bus or multiple bus architecture allows the selective cancellation of signals with each stage containing a successively cleaned received signal. The structure allows the D-R to triage desired signals by extracting them from a mix of received signals and forward them to special purpose receivers. The dual bus structure gives flexibility to the process and allows for successive cancellation of signals in multiple stages to increase effectiveness. One bus may be assigned to the SOI. Identified interfering signals are successively removed from the received signal mix to isolate the SOI. The other bus carries interfering signals whose identification is facilitated by removing the SOI from the bus. The buses are merged together resulting in a clean received signal.

The use of soft cancelation instead of hard cancelation improves the algorithm performance for deadzone and interfering signal removal. In hard cancelation, a receiver determines the symbol sequence of an interferer, if its modulation form can be identified. These symbols are then utilized to rebuild the interfering signal together with knowledge of the signal waveform of the interferer, its carrier and time frequency, and its carrier and timing phases. These auxiliary parameters need to be estimated separately.

In soft cancellation, the system recognizes the fact that estimating the symbol sequence of an interferer may be partially possible, and that such symbol sequence may have a high rate of errors. Thus, the system uses a probabilistic approach to estimate soft symbols by calculating the probability of each of the symbols being present in the interfering signal. From this, the system computes a soft symbol which is used to rebuild the interfering signal instead. It has been shown that this process produces better estimates of the signal to cancel than the hard decision symbol estimate approach employed by the conventional system of FIG. 1.

This document generally concerns implementing systems and methods for operating a communication device so as to cancel interference to a receiver. The methods comprise: receiving a signal comprising a plurality of signal components; obtaining power levels for each signal component; ranking the signal components based on the power levels; assigning the signal components to signal extractors based on the ranking; determining whether each signal component has a sufficient reconstructability; selecting switches of a first set of switches based on the results of the determining; sequentially closing the selected switches of the first set so that each signal component is extracted from the received signal or from a clean signal with one or more given signal components (e.g., a signal of interest and/or an interfering signal) removed from the received signal; selecting switches of a second set of switches based on which signal component comprises a signal of interest; and/or generating a modified received signal by sequentially closing the selected switches of the second set so that the signal components that (i) are absent of a signal of interest and (ii) have sufficient reconstructability are removed from the received signal.

In some scenarios, the sufficiency of reconstructability for each signal component is determined based on at least one of a signal-to-noise ratio, a signal power and a modulation type. For example, each signal component is determined to have sufficient reconstructability when the signal-to-noise ratio or the signal power is greater than a threshold value. In contrast, each signal component is determined to have insufficient reconstructability when the signal-to-noise ratio or the signal power is less than a threshold value. Additionally or alternatively, each signal component is extracted from the received or clean signal using soft symbol estimations. The selected switches of the second set may be associated with signal components other than the signal component comprising the signal of interest.

Figure 2:
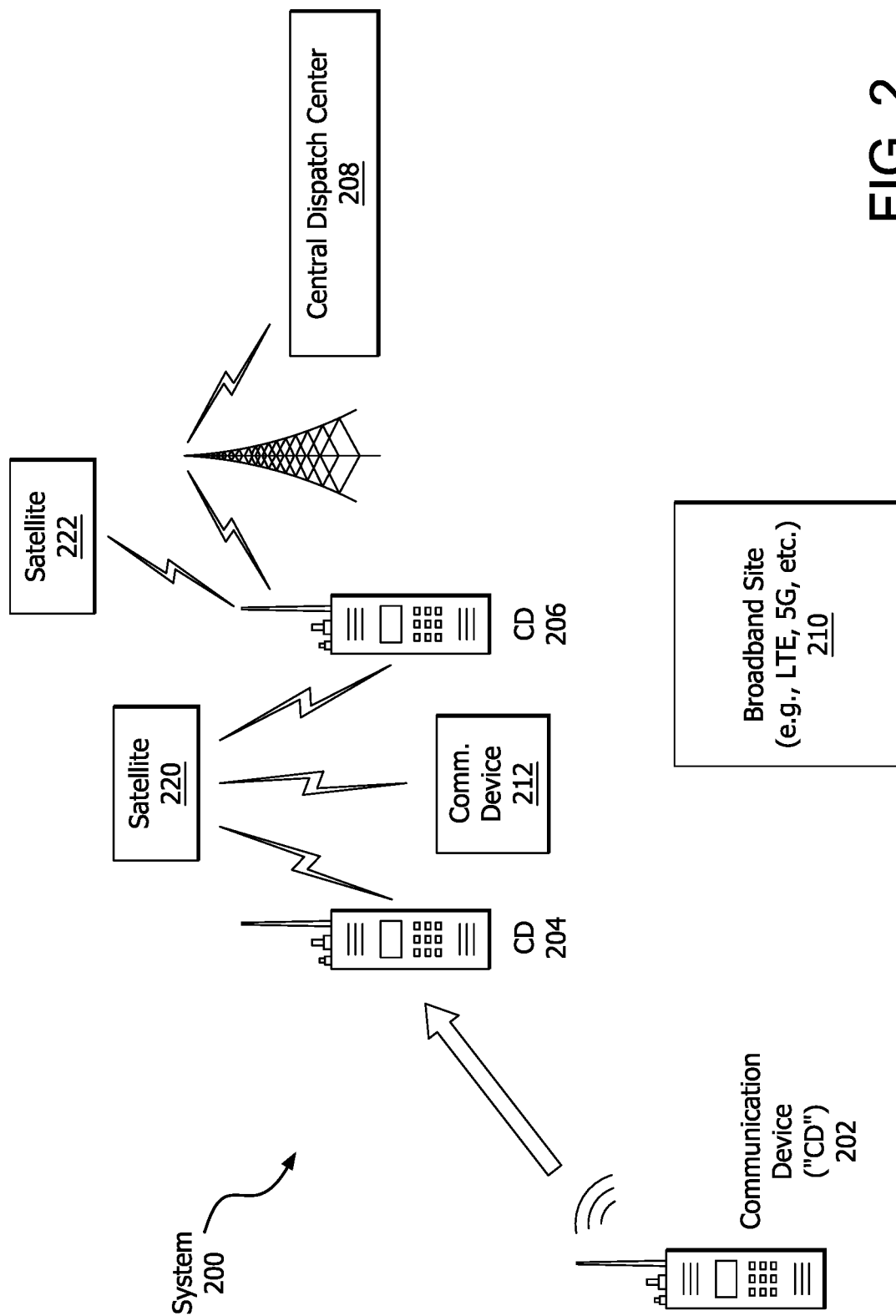
FIG. 2 is an illustration of a system implementing the present solution.

Referring now to FIG. 2, there is provided an illustration of an illustrative system 200. System 200 comprises a plurality of communication devices 202, 204, 206, a Central Dispatch Center (CDC) 208, a broadband site 210, and satellites 220, 222. The communication devices 202-206 include, but are not limited to, a portable radio, a fixed radio with a static location, a smart phone, a ground station, and/or a base station. The broadband site 210 includes, but is not limited to, an LMR site, a 2G cellular site, a 3G cellular site, a 4G cellular site, and/or a 5G cellular site. CDC 208 and broadband site 210 are well known in the art, and therefore will not be described herein.

During operation of system 200, the signals at the satellite 220 need processing in accordance with the present solution since that is where interference is occurring. The primary scenario is that where communication devices all point to the sky, possibly to different satellites 220 and 222, but that unwanted signals impinge on satellite 220. In secondary scenarios, interference may be caused by other source such as the broadband site 210.

As shown in FIG. 2, signals are communicated between the communication devices 202-206, between one or more communication devices 204, 206, 212 and the satellite 220, and/or between one or more communication devices 206 and the CDC 208. For example, communication device 202 communicates a signal to communication device 204, communication devices 204-206 communicate signals to satellite 220, and CDC 208 communicates a signal to communication device 206. Communication devices 204 and 206 perform operations to mitigate interference caused by the broadband site 210 on a given RF communication channel and/or other communication device 212 on a satellite communication channel. The manner in which communication devices 204 and 206 mitigate the interference to signals will become evident as the discussion progresses.

Figure 3:
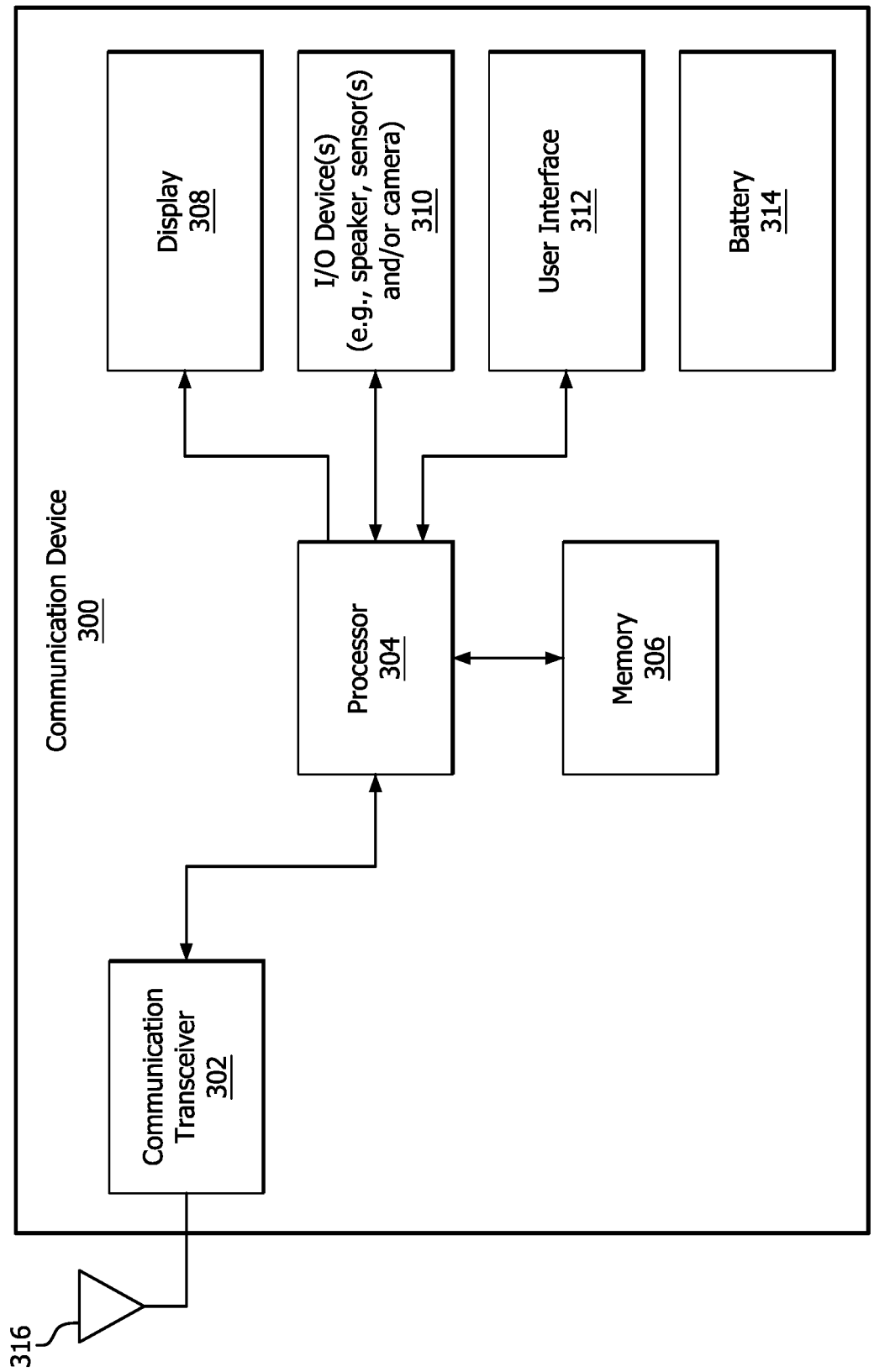
FIG. 3 is an illustration of a communication device architecture.

Referring now to FIG. 3, there is provided an illustration of an illustrative architecture for a communication device 300 which is configured for carrying out the various methods described herein for mitigating the signal interference. Communication devices 202-206 of FIG. 2 are the same as or similar to communication device 300. As such, the discussion provided below in relation to communication device 300 is sufficient for understanding communication devices 202-206 of FIG. 2. Communication device 300 can include more or less components than that shown in FIG. 3 in accordance with a given application. For example, communication device 300 can include one or both components 308 and 310. The present solution is not limited in this regard.

As shown in FIG. 3, the communication device 300 comprises a communication transceiver 302 coupled to an antenna 316. The LMR communication transceiver can comprise one or more components such as a processor, an application specific circuit, a programmable logic device, a digital signal processor, or other circuit programmed to perform the functions described herein. The communication transceiver 302 can enable end-to-end communication services in a manner known in the art. In this regard, the communication transceiver can facilitate communication of data (e.g., voice data and/or media content) from the communication device 300 over a network and/or communications channel (e.g., a satellite communication channel).

The communication transceiver 302 can include, but is not limited to, a radio transceiver, a satellite transceiver, and/or a cellular network communication transceiver. The communication transceiver 302 is connected to a processor 304 comprising an electronic circuit. During operation, the processor 304 is configured to control the communication transceiver 302 for providing communication services. The processor 304 also facilitates mitigation of interference to signals. The manner in which the processor facilitates interference mitigation will become evident as the discussion progresses.

A memory 306, display 308, user interface 312 and Input/Output (I/O) device(s) 310 are also connected to the processor 304. The processor 304 may be configured to collect and store data generated by the I/O device(s) 310 and/or external devices (not shown). The I/O device(s) 310 can include, but are not limited to, a speaker, a microphone, sensor(s) (e.g., a temperature sensor and/or a humidity sensor), and/or a camera. Data stored in memory 306 can include, but is not limited to, one or more look-up tables or databases which facilitate selection of communication groups or specific communication device. The user interface 312 includes, but is not limited to, a plurality of user depressible buttons that may be used, for example, for entering numerical inputs and selecting various functions of the communication device 300. This portion of the user interface may be configured as a keypad. Additional control buttons and/or rotatable knobs may also be provided with the user interface 312. A battery 314 or other power source may be provided for powering the components of the communication device 300. The battery 300 may comprise a rechargeable and/or replaceable battery. Batteries are well known in the art, and therefore will not be discussed here.

The communication device architecture shown in FIG. 3 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 4:
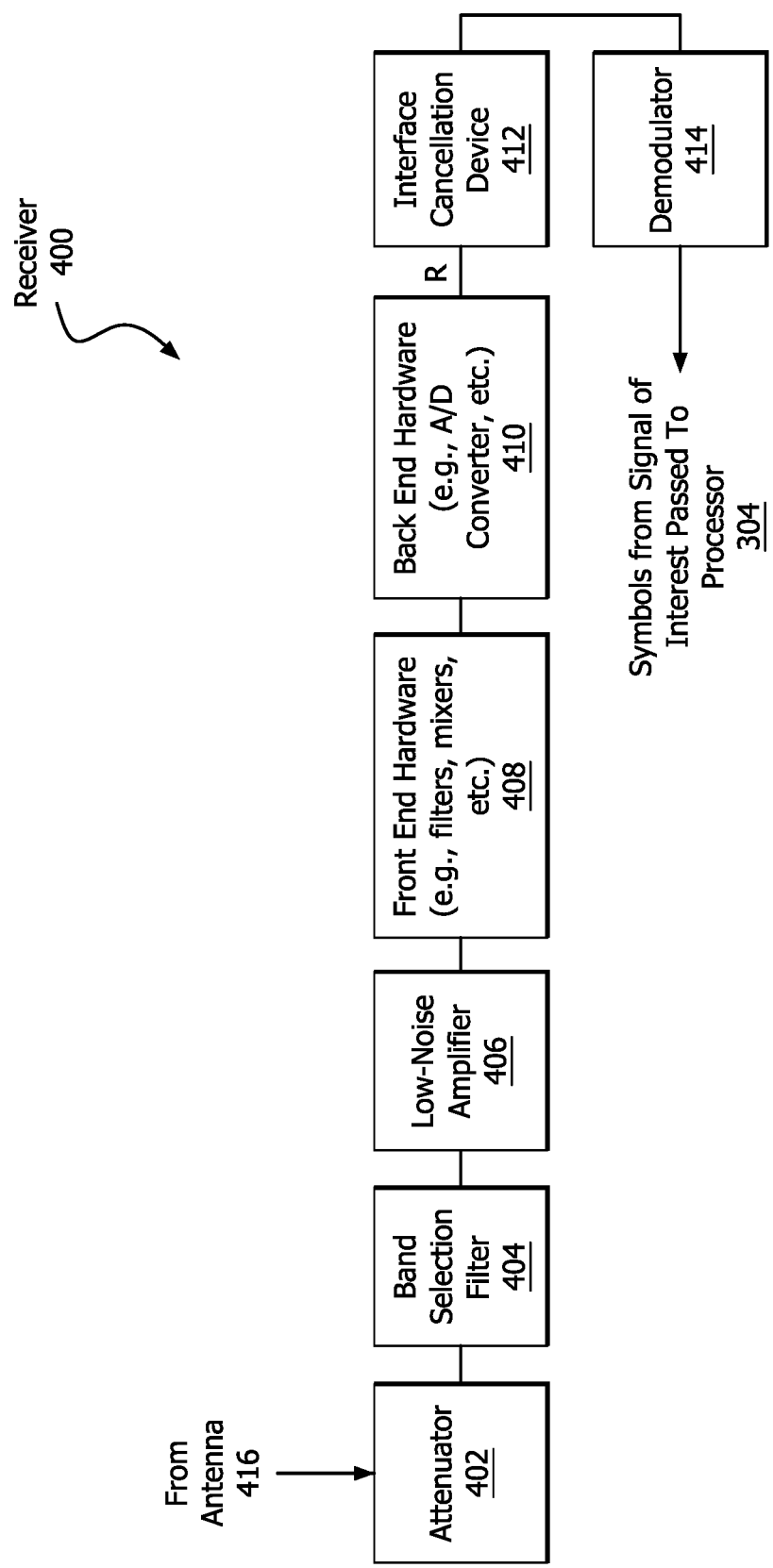
FIG. 4 is an illustration of a receiver architecture.

Referring now to FIG. 4, there is provided a more detailed illustration of an illustrative receiver portion 400 of the communication transceiver 302. Receiver 400 comprises an attenuator 402, a band selection filter 404, a Low-Noise Amplifier (LNA) 406, front end hardware 408, back-end hardware 410, an interference cancellation device 412 and a demodulator 414. Each of the listed devices 402-410 and 414 is known in the art, and therefore will not be described herein. The interference cancellation device 412 implements the present solution and is generally configured to remove interfering signals from received signals. The resulting signal is passed from the interference cancellation device 412 to the demodulator so that, for example, symbols can be extracted therefrom. The manner in which the signal interference is canceled or otherwise removed from received signals will become evident as the discussion progresses.

Figure 5:
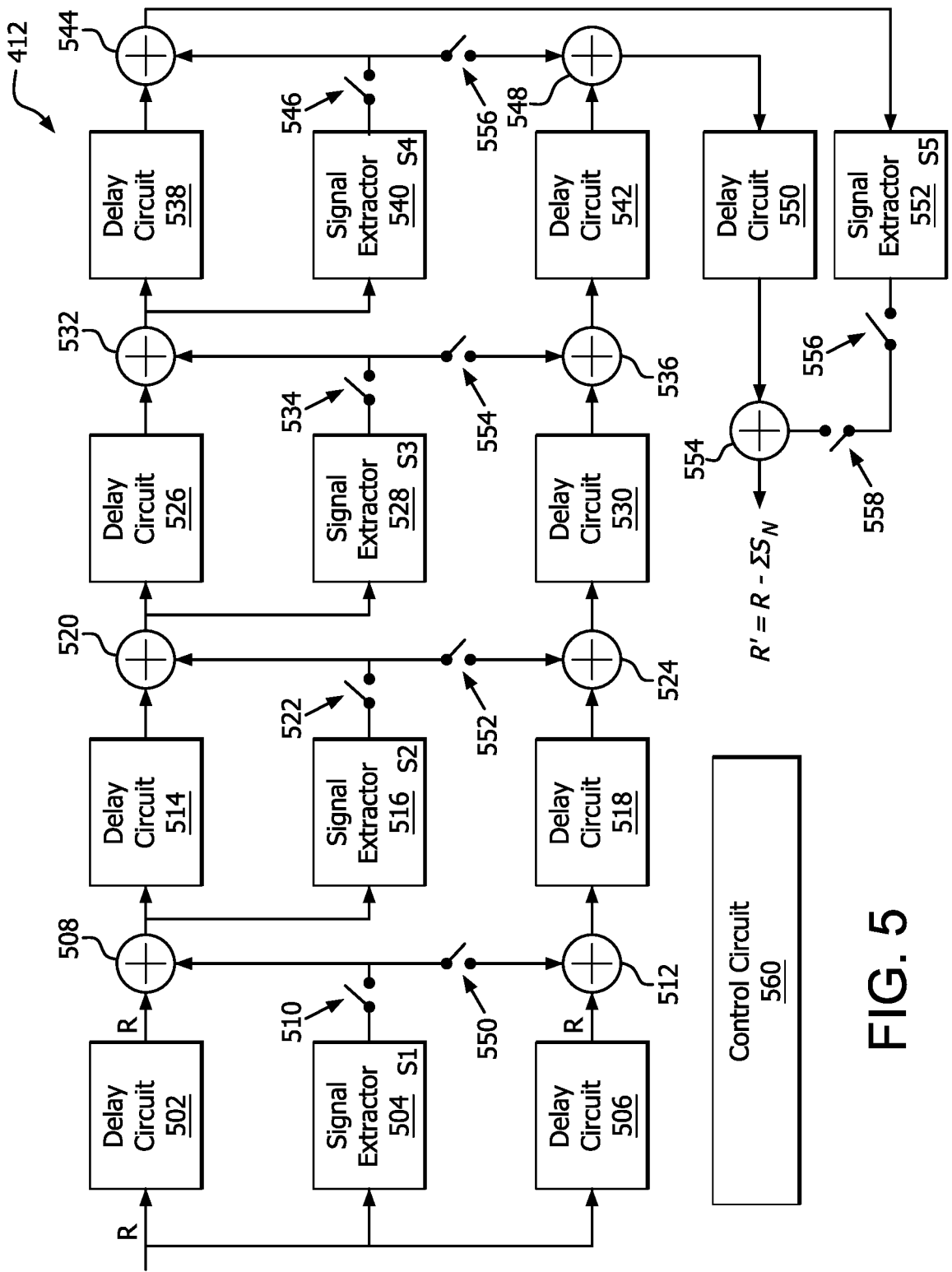
FIG. 5 is an illustration of a device implementing a soft symbol decision approach of the present solution for mitigating interference.

Referring now to FIG. 5, there is provided an illustrative architecture for the interference cancellation device 412. The interference cancellation device 412 comprises delay circuits 502, 506, 514, 518, 526, 530, 538, 550, combiners 508, 512, 520, 524, 532, 536, 544, 548, 554, signal extractors 504, 516, 528, 540, 552, and switches 510, 522, 534, 546, 556, 550, 552, 554, 556. A control circuit 560 may also be provided. In some scenarios, the control circuit 560 comprises processor 304 of FIG. 3.

During operation, the control circuit 560 processes the received signal R to determine a power of each signal component therein. Techniques for determining signal power are well known. The signal components include the SOI and interfering signals. The control circuit 560 then performs operations to rank the signal components based on their power levels. A received signal R comprises a plurality of signal components that are ranked in an order starting from the signal with the highest power and ending with the signal with the lowest power. The signal component with the highest power is referred to herein as S1, and the signal component with the lowest power is referred to herein as SN, where N is an integer (e.g., 5 as shown in FIG. 5). The intermediate signal components are referred to herein as S2, S3, . . . , $S_{N-1}$ (e.g., S4 as shown in FIG. 5).

The signal components S1-SN are respectively assigned by the control circuit 560 to the signal extractors. For example, as shown in FIG. 5, signal component S1 is assigned to signal extractor 504. Signal component S2 is assigned to signal extractor 516. Signal component S3 is assigned to signal extractor 528. Signal component S4 is assigned to signal extractor 540. Signal component S5 is assigned to signal extractor 552. The present solution is not limited to the particulars of this example. The signals can be assigned to the signal extractors in accordance with any given application.

Figure 6:
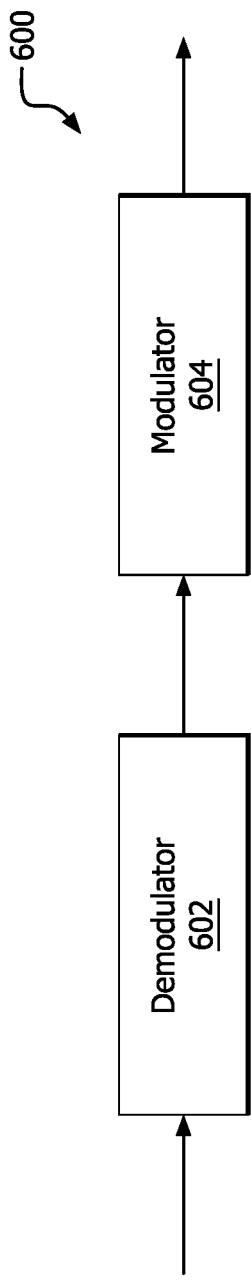
FIG. 6 provides an illustration of a signal estimator.

Each signal extractor is generally configured to process an input signal and extract a given signal component (i.e., generate an output signal representing the respective signal component S1, . . . , SN). In this regard, each signal extractor comprises a D-R engine 600 with a demodulator 602 and a modulator 604 as shown in FIG. 6. Demodulator 602 comprises an electronic circuit and/or computer program that is (are) configured to separate information that was modulated onto a carrier wave from the carrier wave itself. An output of the demodulator 602 is passed to the modulator 104. The modulator 604 performs operations to vary one or more properties of the waveform to produce a waveform representing a signal component S1, . . . , or SN.

Figure 7:
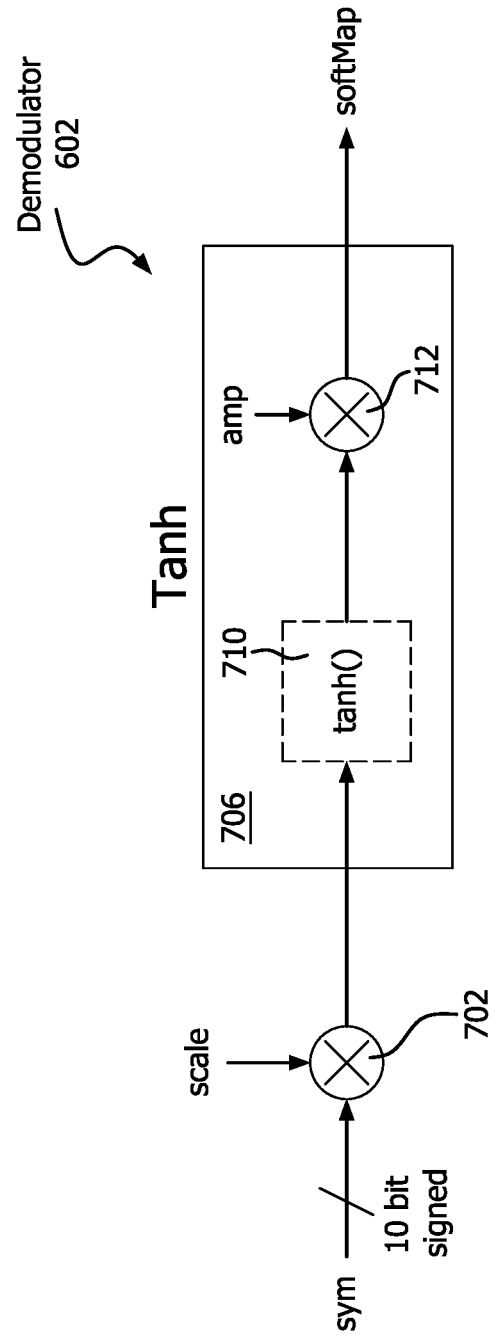
FIG. 7 provides an illustration of a demodulator.

An illustrative architecture for the demodulator 602 is provided in FIG. 7. As shown in FIG. 7, the demodulator 602 employs integer math to obtain soft symbol values between +1 and −1 for each symbol in the signal component S1, . . . , or SN. The soft symbol is obtained via tanh( ) function 710. The tanh( ) function is well known as a function that returns a hyperbolic tangent of a number. An input symbol sym is combined in 702 with a value scale. The scaling function 702 is performed to align or otherwise format the data for processing by the tanh( ) function. scale is related to an estimated Signal to Noise Ratio (SNR) of the component signal. The soft bit output from the tanh( ) function is combined at 712 with a value amp for normalization.

It should be noted that the demodulator 602 can be used with different types of modulation. The modulation types can include, but are not limited to, Binary Phase Shift Keying (BPSK), Quadrature Phase Shift Keying (QPSK), 8 Phase Shift Keying (8PSK), 16 Quadrature Amplitude Modulation (16QAM), Offset QPSK (OQPSK) and/or other types of linear modulation. The demodulator architecture shown in FIG. 7 is based on a basic soft BPSK estimator. Multiple soft BPSK symbol estimators are combined into a required specific symbol estimator for the identified modulation format. The demodulator 602 operates correctly irrespective of the bit mapping that the original SOI or interfering signals are using. The demodulator 602 is fully agnostic to the values and mapping of any information carried in these signals.

Referring back to FIG. 5, the control circuit 560 performs operations to select which switches of a first set of switches 510, 522, 534, 546, 556 are to be closed in subsequent signal extraction operations. This selection is based on the reconstructablitliy of the component signals. The reconstructablitliy may be determined based on signal power and/or modulation method (e.g., PSK). In some scenarios (e.g., when all signals have the same modulation type such as PSK), the reconstructability of each component signal may be determined by comparing its SNR or power to a threshold value. The component signal is deemed to have a sufficient reconstructability when its SNR or power exceeds or is equal to the threshold value. When this occurs, the corresponding switch is closed or otherwise actuated during operation of the interference cancellation device. Since S1 has the greatest power, it is considered the most reconstructable out of signal components S1-SN. SN is considered the least reconstructable because it has the smallest power.

Illustrations are provided in FIGS. 8A-8E which shows that all switches 510, 522, 534, 546, 556 were selected for closure and are closed in a sequential manner. All of the switches 510, 522, 534, 546, 556 are closed in the sequential manner because (i) all signals contain information modulated in accordance with the same modulation technique and (ii) the SNRs or powers of signals S1-S5 exceed the threshold value. This may not be the case in all scenarios. One or more of the SNRs or power of signals S1-S5 may be less than the threshold value. In this case, the switches associated therewith are not closed. Illustrations are provided in FIG. 9A that shows only switches 510, 522, 534 in their closed positions. Switches 546 and 556 remain in their open position because the SNRs or powers of signals S4 and S5 do not exceed the threshold value. The present solution is not limited to the particulars of these scenarios.

Control of switches 510, 522, 534, 546 and/or 556 facilitates an improved extraction of the component signals from the received signal R in an iterative or sequential manner. The component signals (except for the component signal with the highest power level) are extracted using a cleaned version of the received signal R. Each cleaned version comprises the received signal R with at least one component signal removed therefrom which has a satisfactory reconstructability.

Figure 8A:
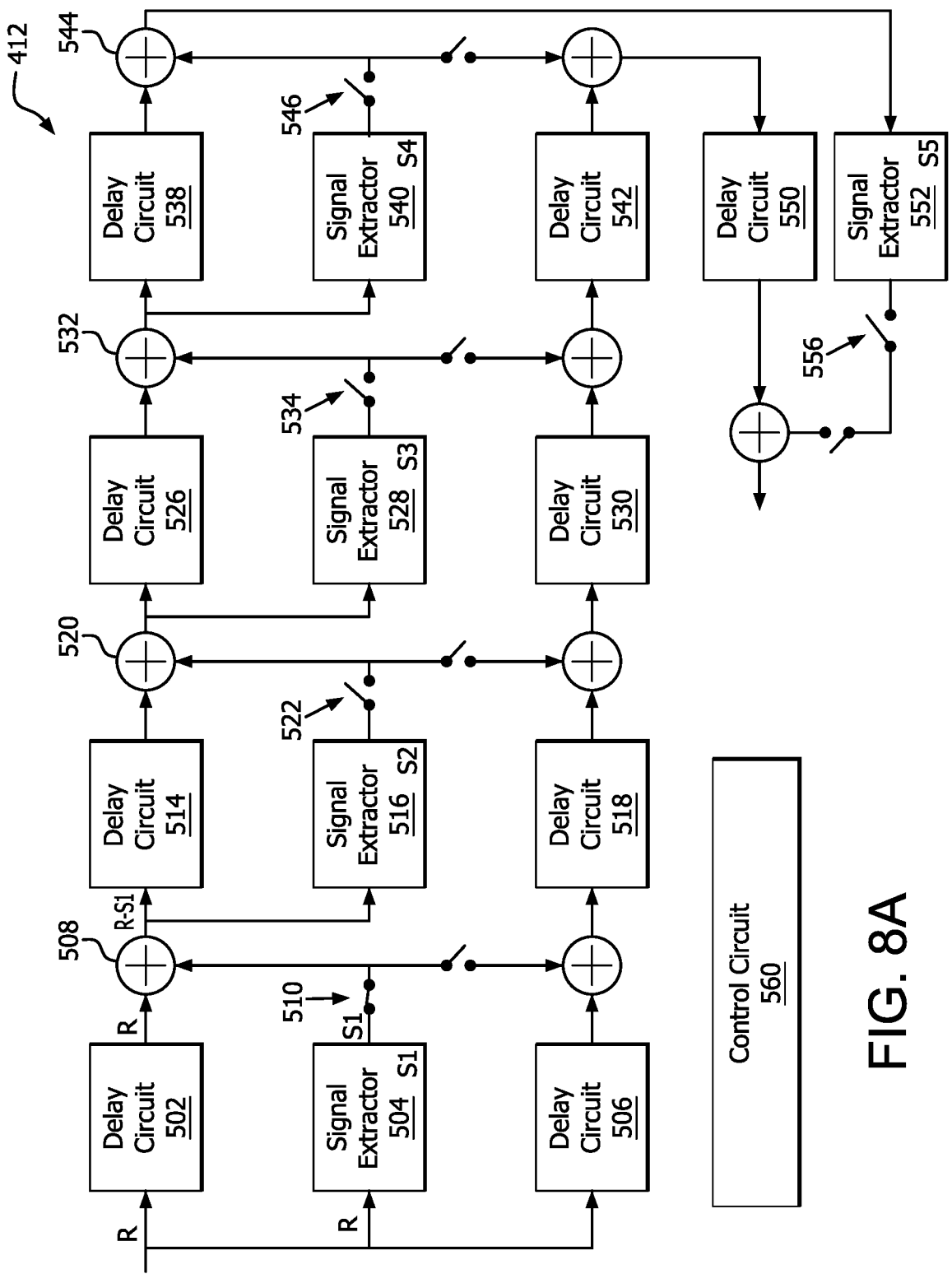
FIGS. 8A-8J (collectively referred to herein as "FIG. 8") provide illustrations that are useful for understanding operations of an interference cancellation device in accordance with the present solution.
Figure 8B:
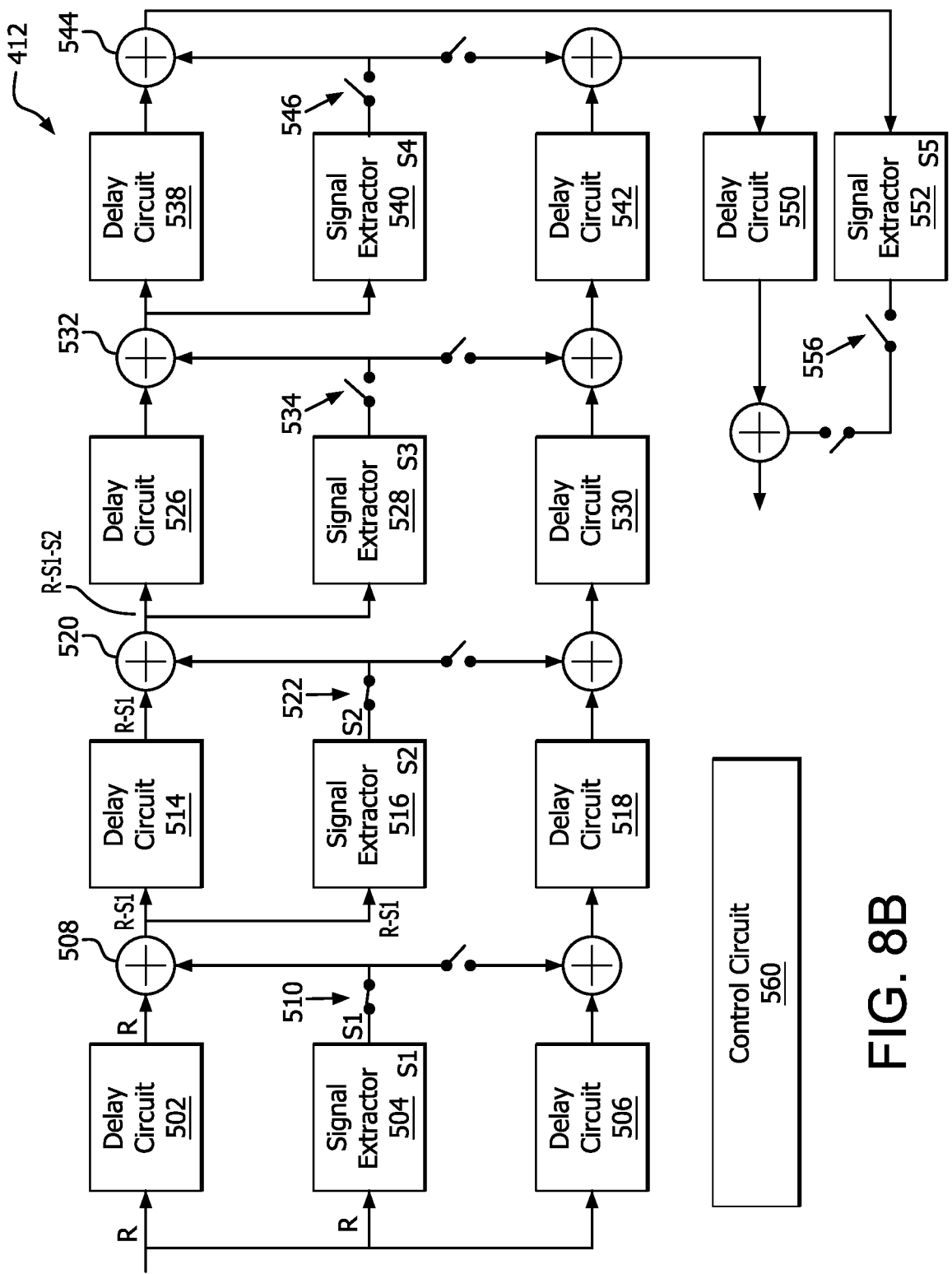
Figure 8C:
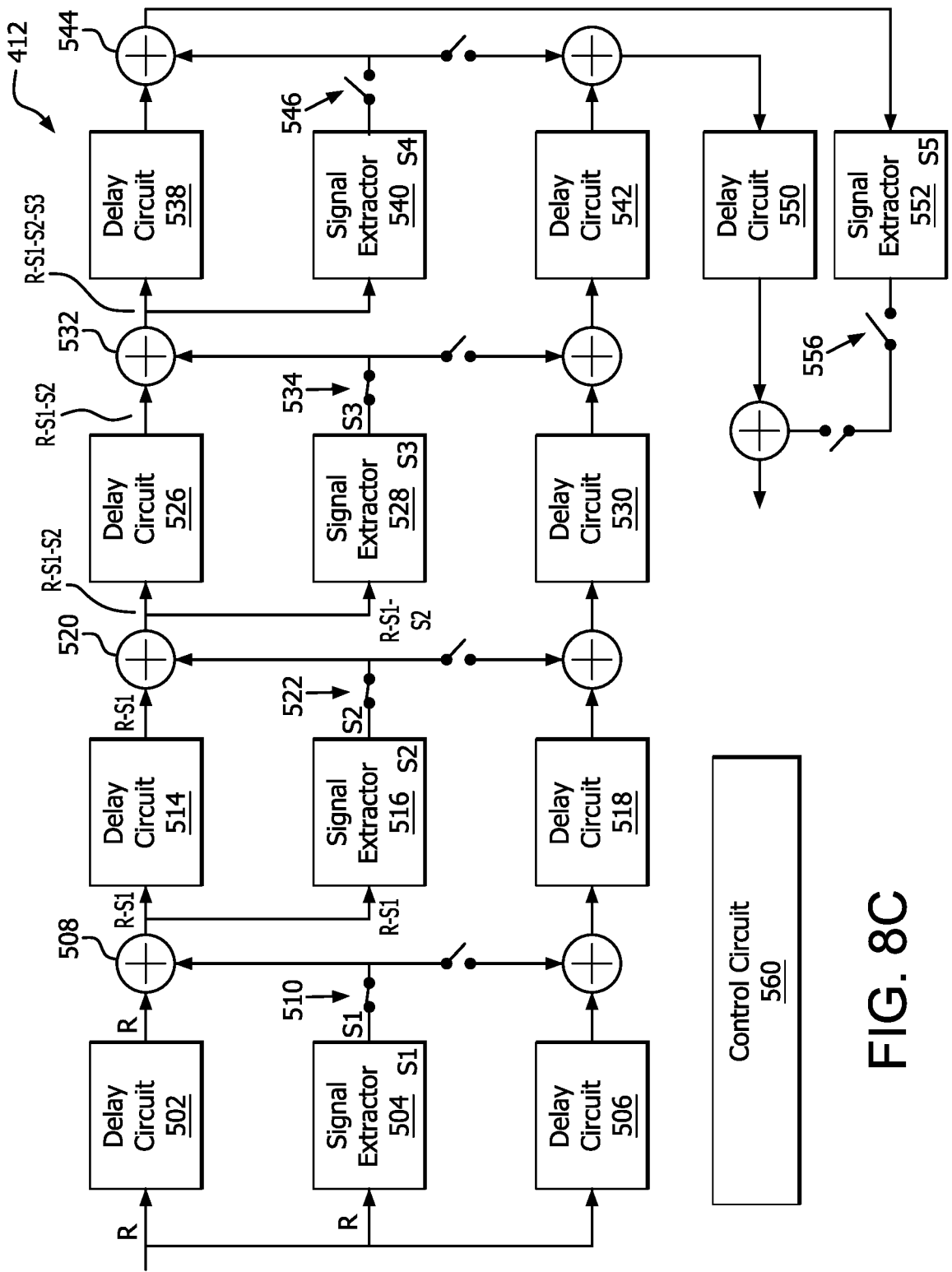
Figure 8D:
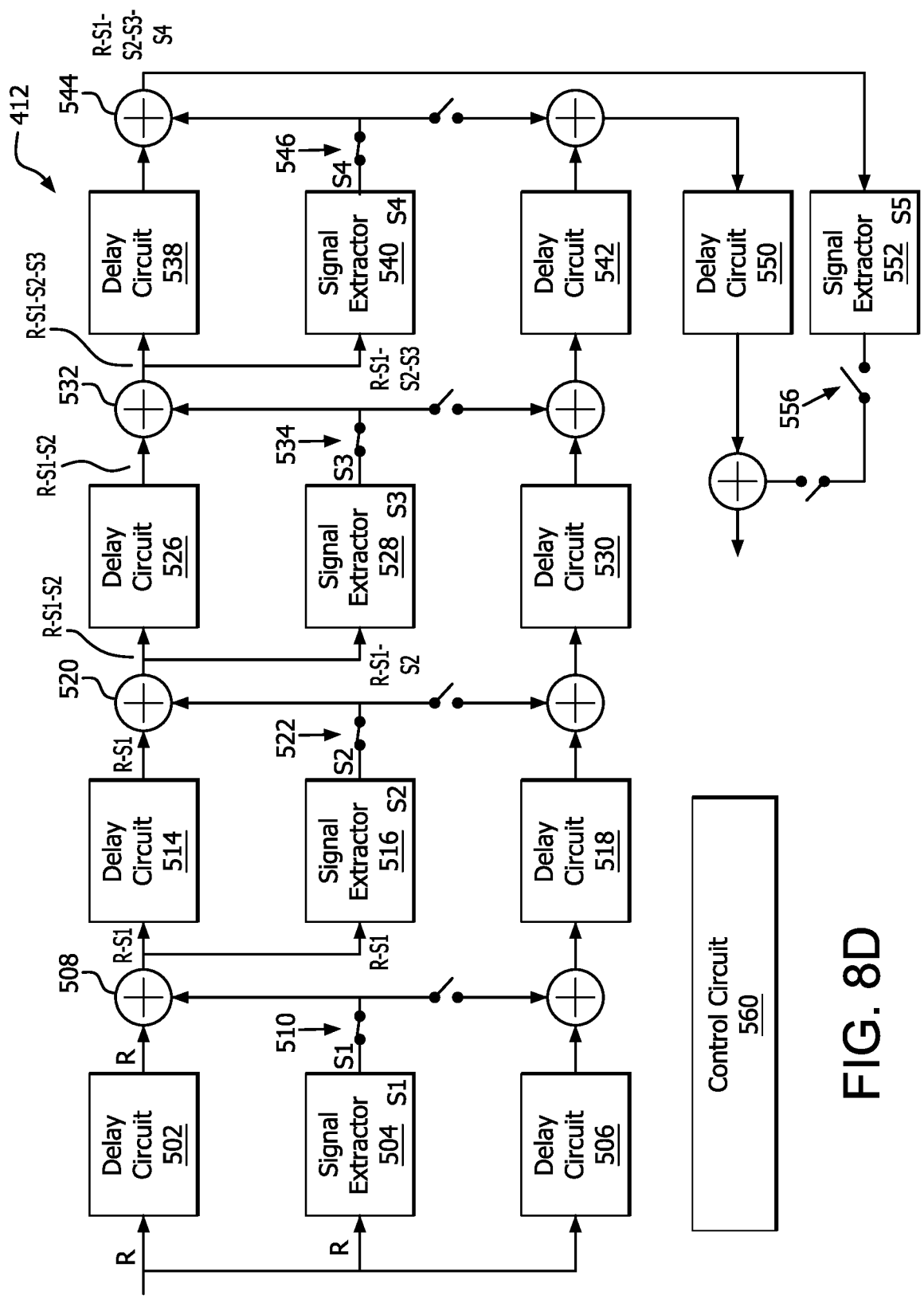
Figure 8E:
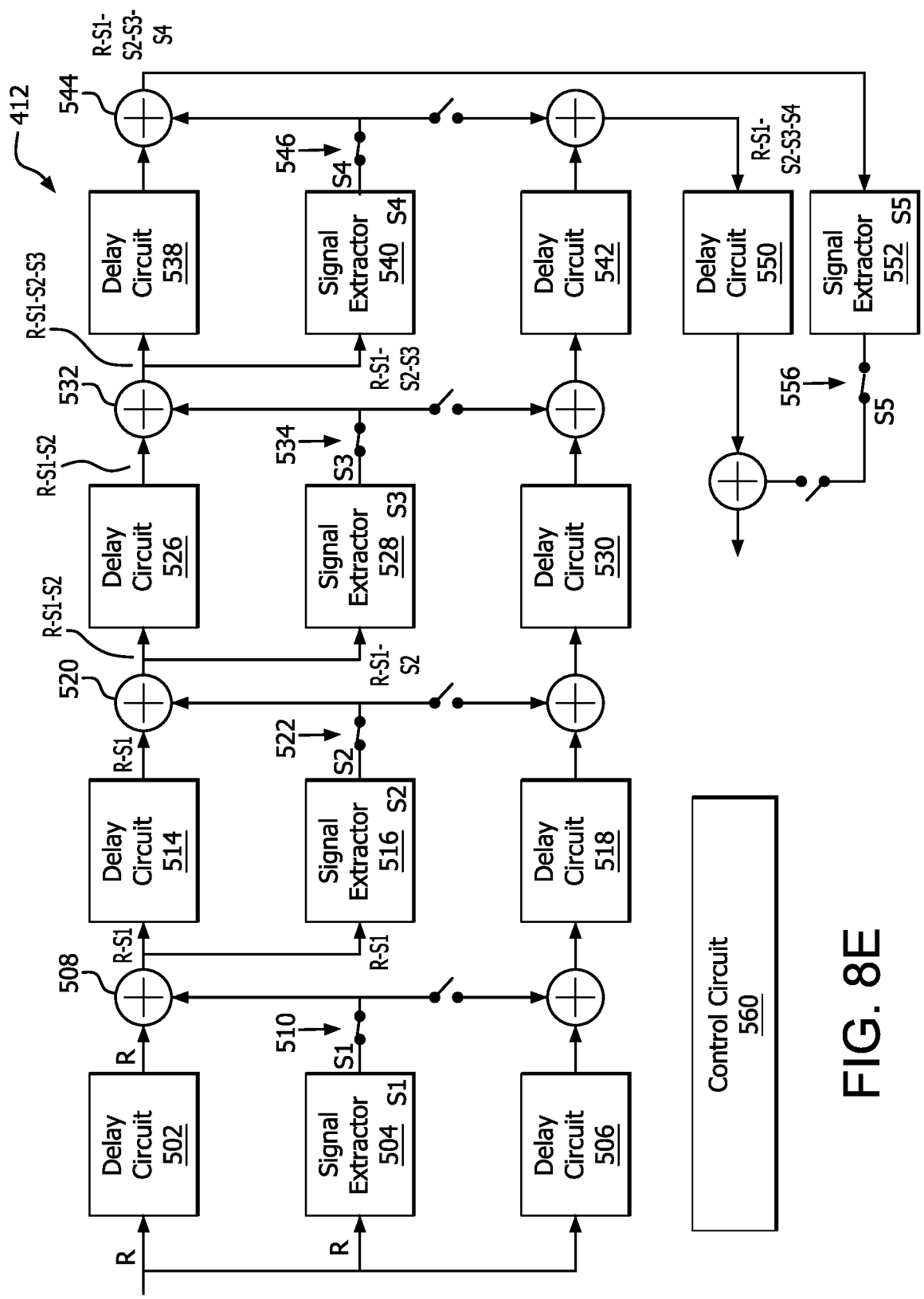
Figure 8F:
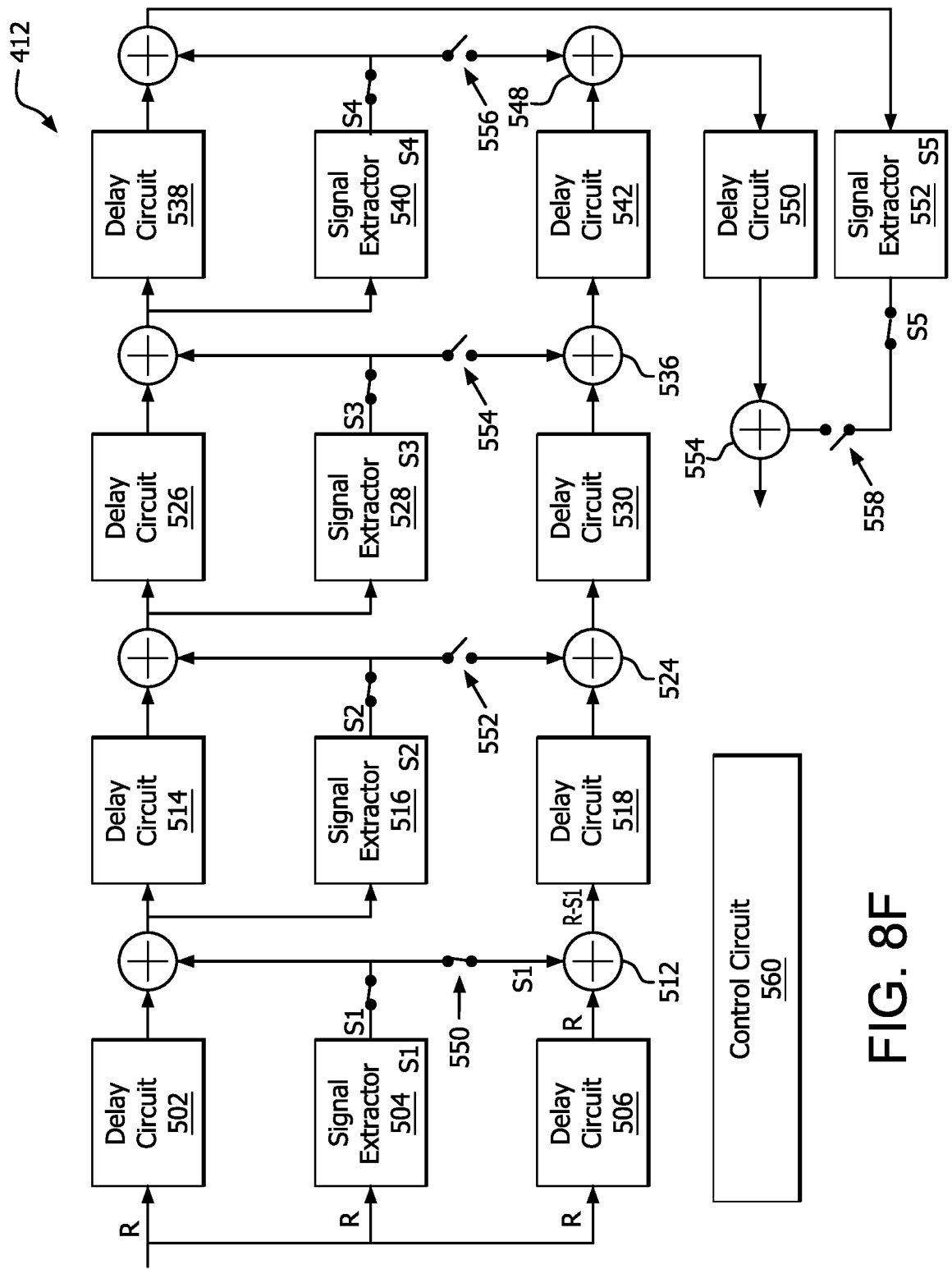
Figure 8G:
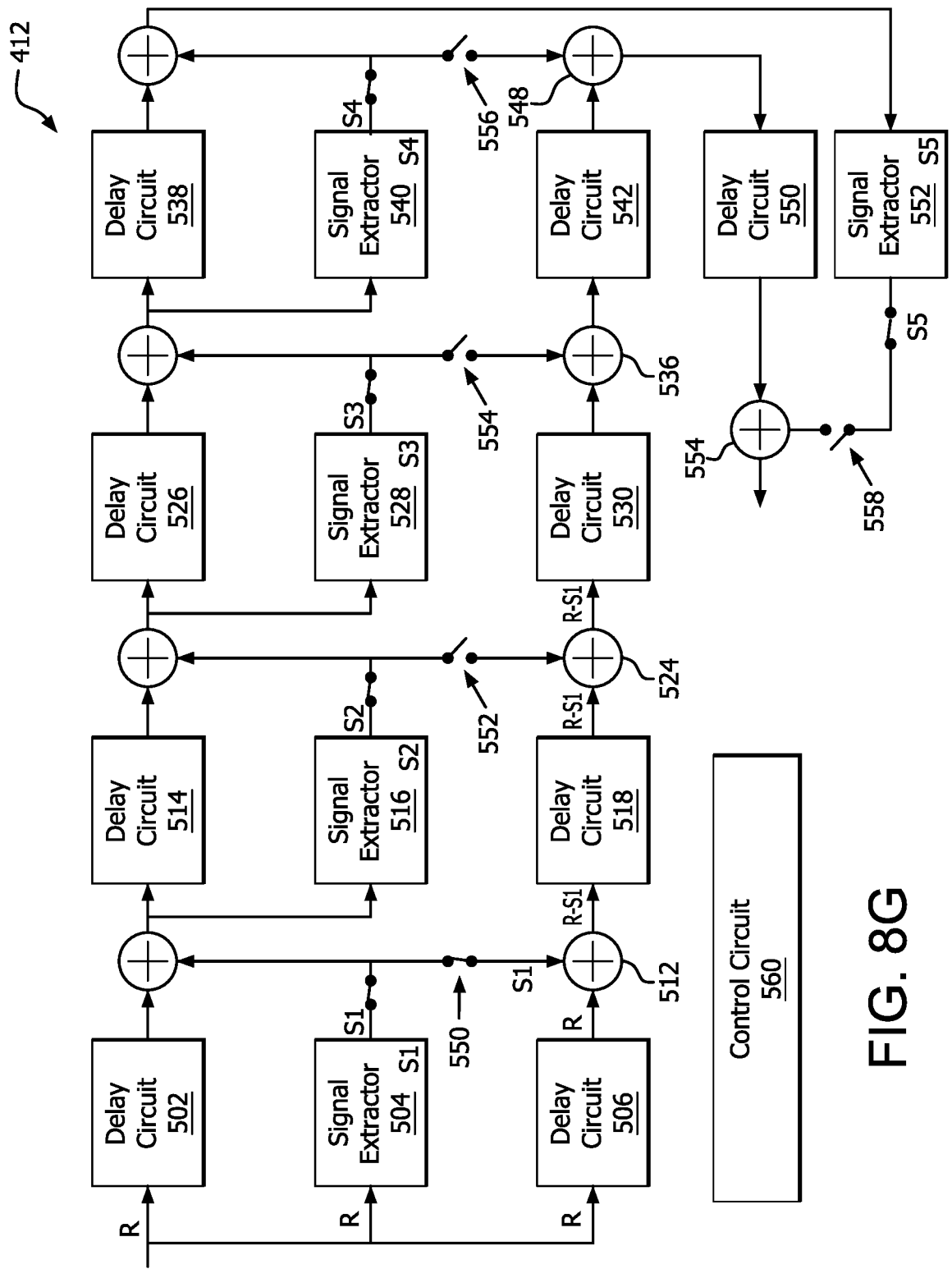
Figure 8H:
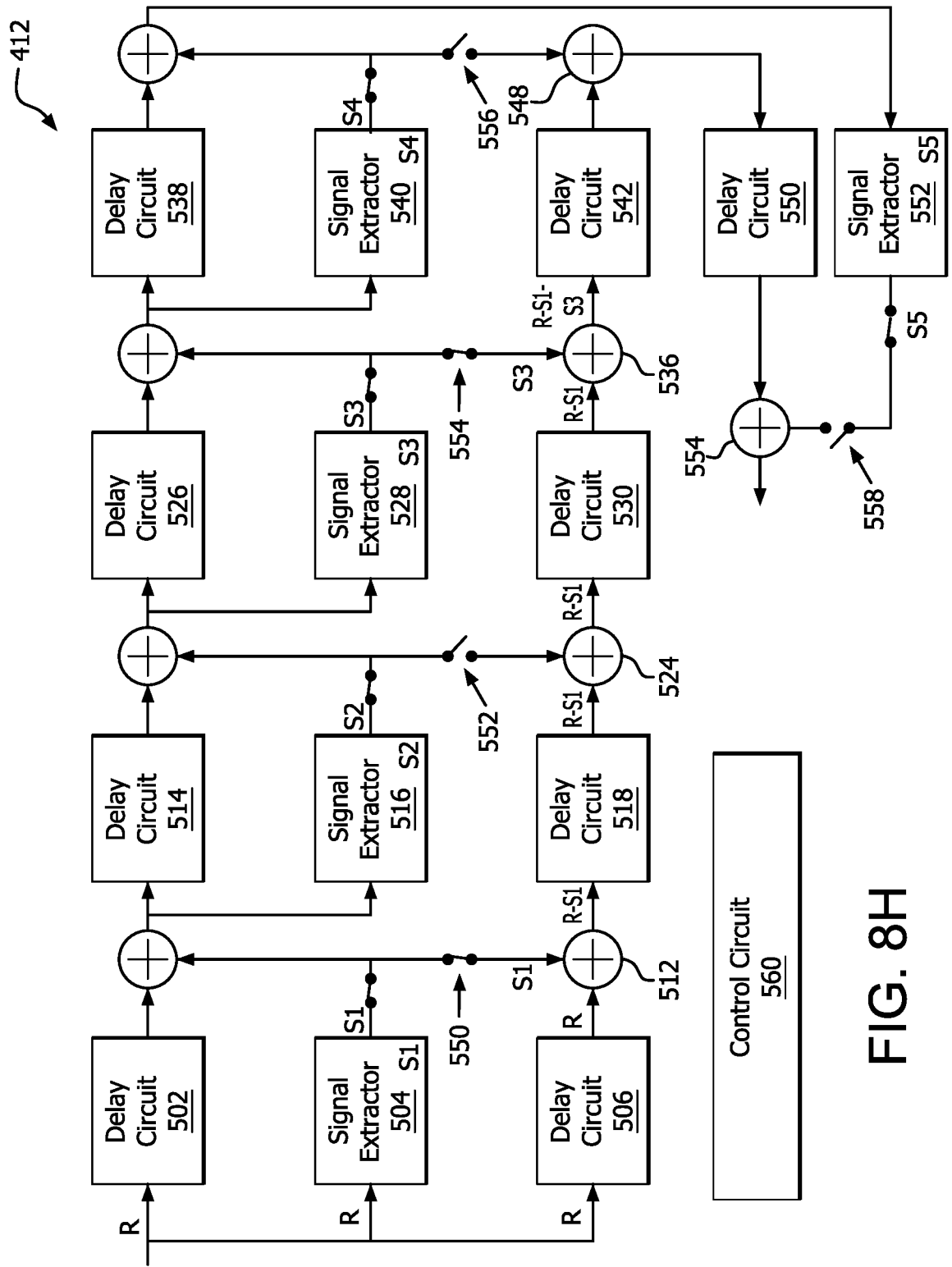
Figure 8I:
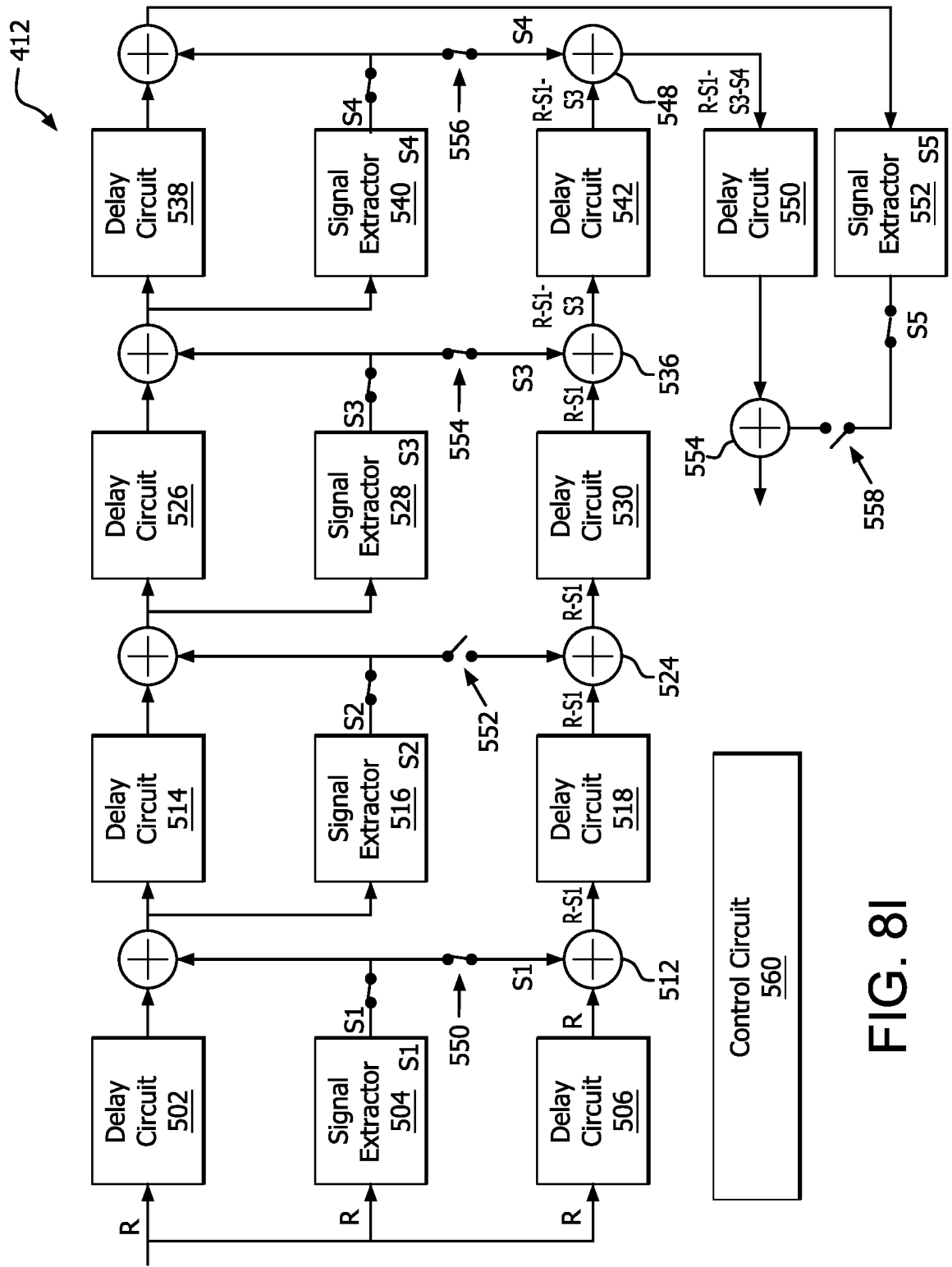
Figure 8J:
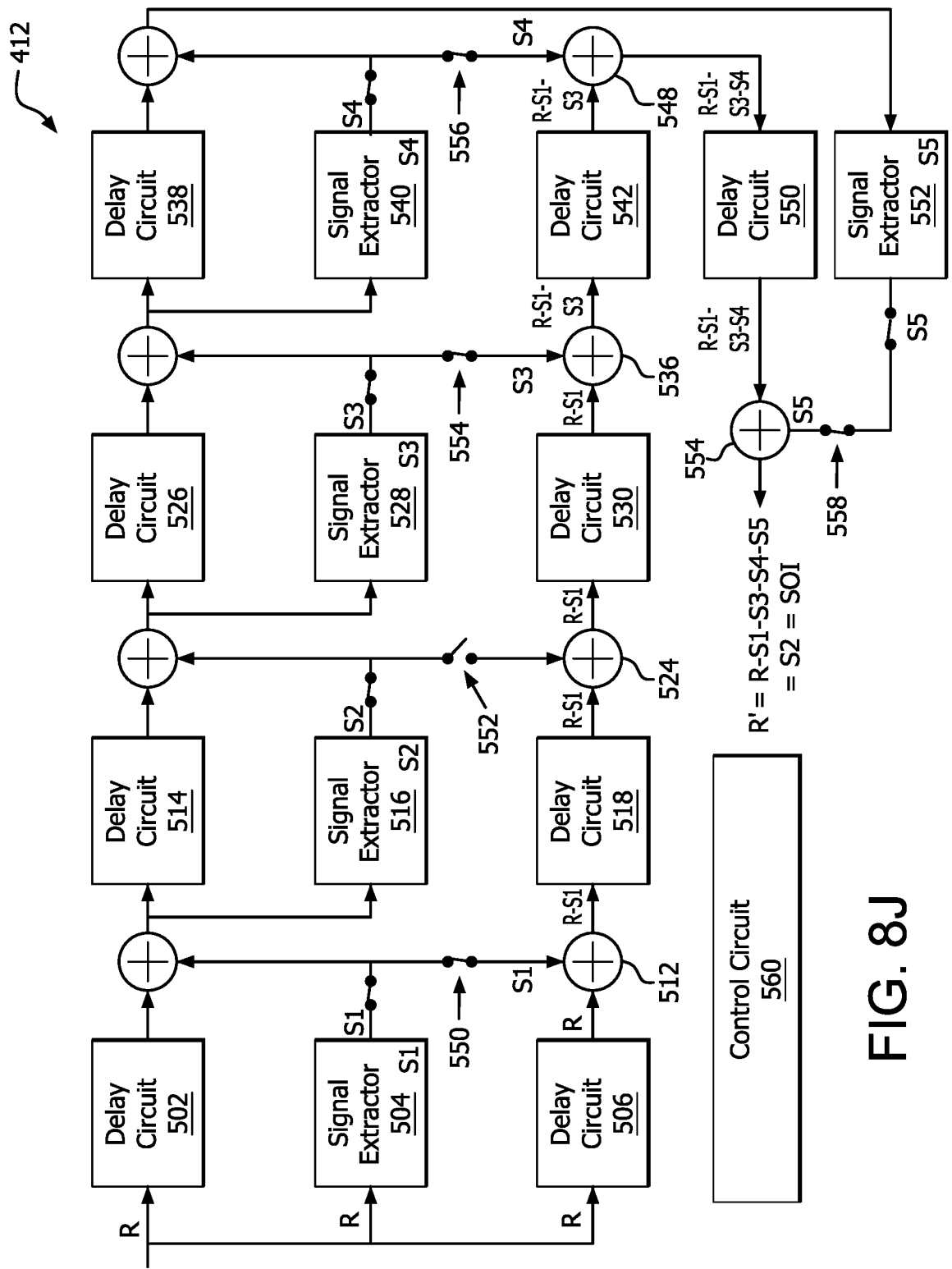
Figure 9A:
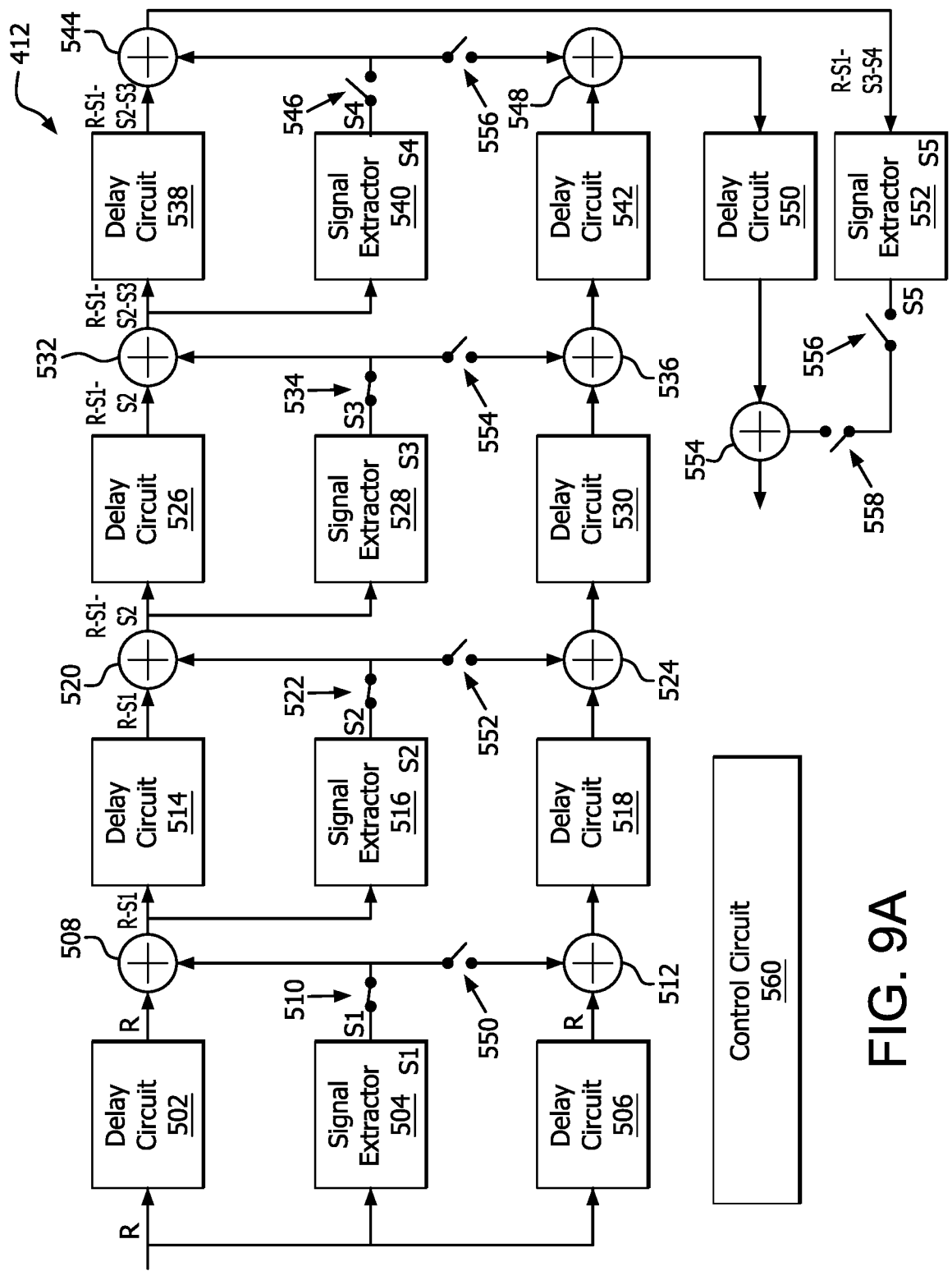
FIGS. 9A-9B (collectively referred to herein as "FIG. 9") provide illustrations that are useful for understanding operations of an interference cancellation device in accordance with the present solution.

Illustrative extraction operations are shown in FIG. 8. In FIG. 8, all of the component signals have satisfactory reconstructability. The extraction operations begin by providing the received signal R to signal extractor 504, as shown in FIG. 8A. Signal extractor 504 performs operations to extract signal S1 from the received signal R. Since switch 510 is closed, signal S1 is passed to combiner 508. At combiner 508, signal S1 is subtracted or otherwise removed from signal R to produce cleaned signal R-S1. The cleaned signal R-S1 is provided to a next signal extractor 516 as shown in FIG. 8B. Signal extractor 516 performs operations to extract signal S2 from the cleaned signal R-S1. Since switch 522 is closed, signal S2 is passed to a next combiner 520 where it is subtracted or otherwise from the cleaned signal R-S1 (delayed and output from delay circuit 514) to produce a further cleaned signal R-S1-S2. The cleaned signal R-S1-S2 is provided to a next signal extractor 528 as shown in FIG. 8C. Signal extractor 528 performs operations to extract signal S3 from the cleaned signal R-S1-S2. Since switch 534 is closed, signal S3 is passed to combiner 532. At combiner 532, signal S3 is subtracted or otherwise removed from the cleaned signal R-S1-S2 (delayed by and output from delay circuit 526) to produce a further cleaned signal R-S1-S2-S3. Cleaned signal R-S1-S2-S3 is provided to signal extractor 540 as shown by FIG. 8D. Signal extractor 540 performs operations to extract signal S4 from the cleaned signal R-S1-S2-S3. Since switch 546 is closed, signal S4 is passed to combiner 544. At combiner 544, signal S4 is subtracted from the cleaned signal R-S1-S2-S3 (delayed by and output from delay circuit 538) to produce a further cleaned signal R-S1-S2-S3-S4. Cleaned signal R-S1-S2-S3-S4 is input into signal extractor 552 as shown in FIG. 8E. Signal extractor 552 performs operations to extract signal S5 from the cleaned signal R-S1-S2-S3-S4. The present solution is not limited to the particulars of FIGS. 8A-8E. For example, as shown in FIG. 9A, signal S4 is not extracted from the received signal to produce a further cleaned signal to be used in extracting signal S5 since it was deemed to be of insufficient reconstructability.

Once the component signals S1, . . . , SN have been extracted from the received signal R, the control circuit 560 performs operations to select which switches in a second set of switches 550, 552, 554, 556, 558 should be closed. This selection is based on which signal S1, . . . , SN comprises the SOI. For example, with reference to FIG. 8 and assuming that signal S2 is the SOI, all switches except for the switch associated with the SOI branch are selected, i.e., switches 550, 554, 556, 558 are selected for closure in subsequent interference cancellation operations. Switch 552 is not selected for closure in subsequent interference cancellation operations. The present solution is not limited to the particulars of this example.

Figure 9B:
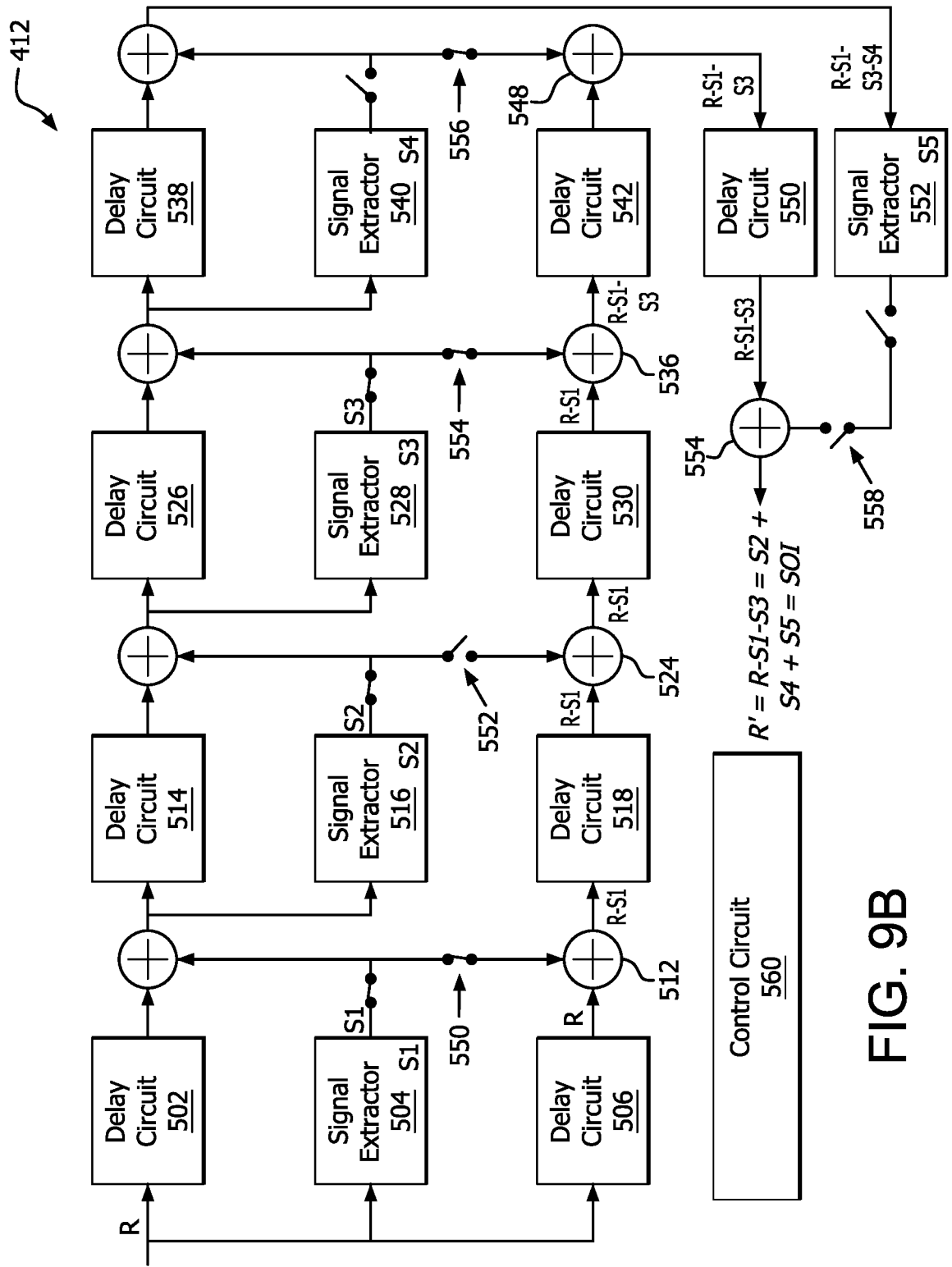

The interference cancellation operations involve sequentially operating the selected switches so that interfering signals are canceled or otherwise removed from the received signal R. The resulting signal comprises the SOI. For example, with reference to FIGS. 8F-8J, the switches 550, 554, 556, 558 are sequentially closed whereby the interfering signals S1, S3, S4 and S5 are removed from the received signal R to produce a signal R'. Signal R' comprises signal S2 which represents the SOI. More specifically, the received signal R is provided to the combiner 512 via delay circuit 506 as shown in FIG. 8F. Since switch 550 is closed, signal S1 is provided to combiner 512. At combiner 512, the signal S1 is subtracted or otherwise removed from signal R to produce signal R-S1. The resulting signal R-S1 is provided to a next combiner 524 via delay circuit 518, as shown in FIG. 8G. Since S2 comprises the SOI, switch 552 is not closed such that nothing is removed from the signal R-S1 at combiner 524. As shown in FIG. 8H, the signal R-S1 is input into combiner 536 via delay circuit 530. Signal S3 is also provided to combiner 536 since switch 554 is closed. Combiner 536 subtracts or otherwise removes signal S3 from signal R-S1 to produce signal R-S1-S3. The resulting signal R-S1-S3 is delayed by delay circuit 542 and passed to a next combiner 548 as shown in FIG. 8I. Signal S4 is also input into the combiner 548 since switch 556 is closed. At combiner 548, signal S4 is subtracted or otherwise removed from signal R-S1-S3 to produce signal R-S1-S3-S4. The resulting signal R-S1-S3-S4 is passed to combiner 554 via delay circuit 550 as shown in FIG. 8J. Signal S5 is also passed to combiner 554 since switch 558 is closed. Combiner 554 performs operations to subtract or otherwise remove signal S5 from signal R-S1-S3-S4 to produce signal R'. Signal R' comprises the received signal with the interfering signals S1, S3, S4 and S5 removed therefrom. Notably, S2 is contained in signal R', thus signal R' represents the SOI. The present solution is not limited to the particulars of FIG. 8. For example, in other scenarios such as that shown in FIG. 9B, at least some of the extracted component signals (e.g., signals S2, S4 and S5) are not subtracted or otherwise removed from the received signal R. It should be noted that at least the component signal comprising the SOI is not removed from the received signal R during the interference cancellation operations.

Once the SOI has been obtained, it is provided to a demodulator, a processor (e.g., processor 304 of FIG. 1) and/or other device for further processing. For example, the SOI is first demodulated by a demodulator (e.g., demodulator 414 of FIG. 4) and then output on a display (e.g., display 308 of FIG. 3) and/or from another output device (e.g., a speaker).

Figure 10A:
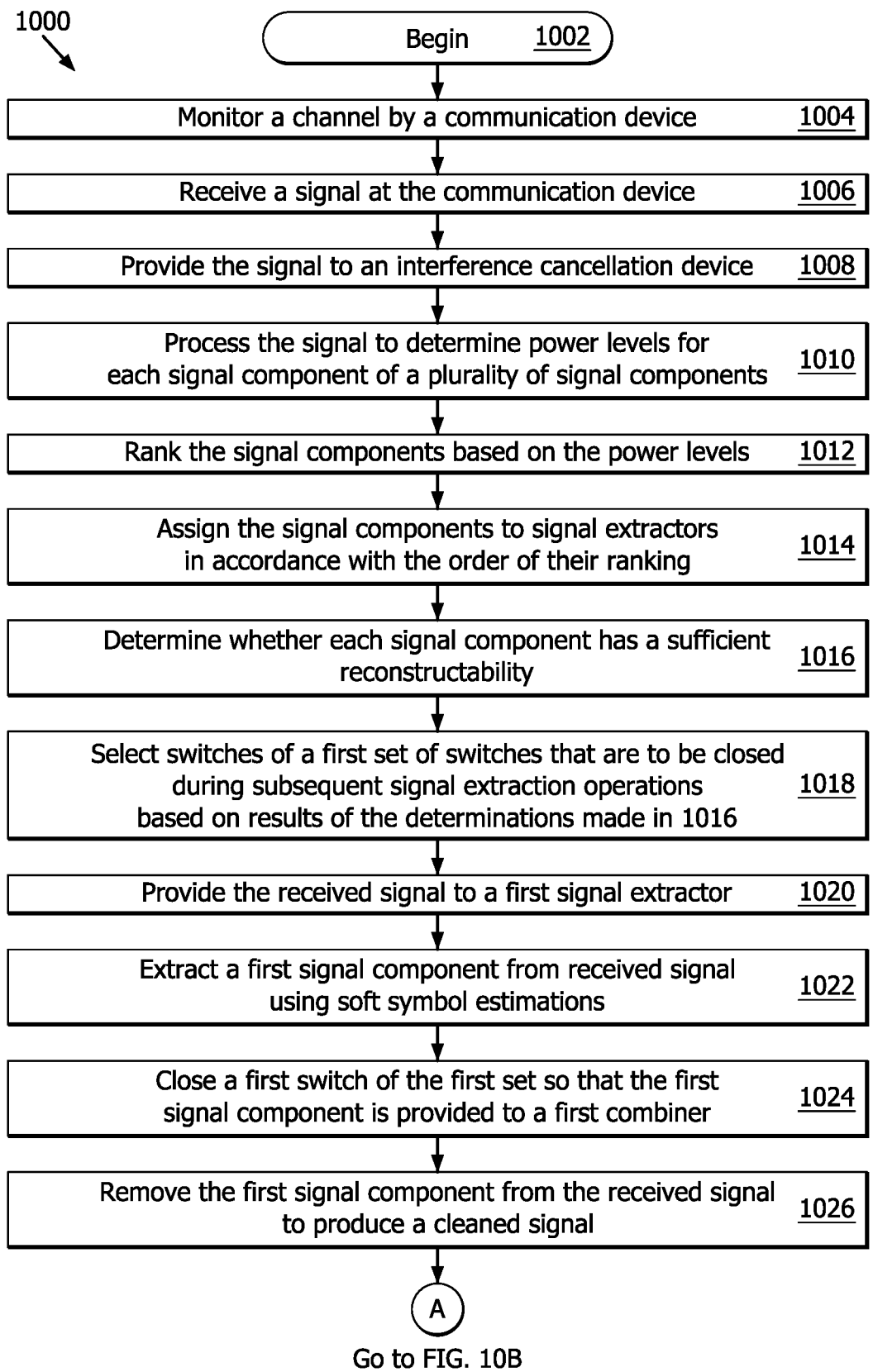
FIGS. 10A-10B (collectively referred to herein as "FIG. 10") provide[[s]] a flow diagram of an illustrative method for mitigating interference.

Referring now to FIG. 10, there is provided a method 1000 for mitigating interference. Method 1000 implements the process described above in relation to FIGS. 8-9. As stated above, the SOI can be removed, as any signal, at any stage of the extraction process depending on its ranking. However, when the SOI is removed, it is only for the purpose of further enabling the removal of other interfering signals (e.g., top rail of the processing chain shown in FIGS. 8-9). Care should be taken that the SOI is not removed from the other processing rail (e.g., bottom rail of the processing chain shown in FIGS. 8-9).

Method 1000 begins with 1002 and continues with 1004 where a communication device (e.g., communication device 204 or 206 of FIG. 1) performs operations to monitor a communications channel (e.g., a satellite communication channel). Methods for monitoring communication channels are well known in the art. The communication device receives a signal (e.g., signal R of FIG. 5) in 1006. Methods for receiving signals are well known in the art.

In 1008, the received signal is provided to an interference cancellation device (e.g., interference cancellation device 412 of FIG. 4). The interference cancellation device may be provided in a receiver (e.g., receiver 400 of FIG. 4) of the communication device. At the interference cancellation device, operations are performed in 1010 to determine power levels for each signal component of a plurality of signal components (e.g., signal components S1, S2, S3, S4, S5 of FIGS. 8 and 9) contained in the received signal. Next in 1012, the signal components are ranked based on the power levels. For example, the component signals are ordered or otherwise ranked starting from the signal with the greatest power level and ending with the signal with the smallest power level. The present solution is not limited in this regard.

Once ranked, the signal components are assigned to signal extractors (e.g., signal extractors 504, 516, 528, 540, 552 of FIG. 5) as shown by 1014. For example, the signal component (e.g., signal component S1 of FIG. 5) with the highest ranking is assigned to a first signal extractor (e.g., signal extractor 504 of FIG. 5) in a chain of signal extractors. A signal component (e.g., signal component S2 of FIG. 5) with the next highest ranking is assigned to a next signal extractor (e.g., signal extractor 516 of FIG. 5), and so on. The signal component (e.g., signal component S5 of FIG. 5) with the lowest ranking is assigned to a last signal extractor (e.g., signal extractor 552 of FIG. 5) in the chain of signal extractors. The present solution is not limited to the particulars of this example.

In 1016, a determination is made as to whether or not each signal component has a sufficient reconstructability. This determination can be made based on signal power and/or modulation method (e.g., PSK). For example, when all signals have the same modulation type such as PSK, the reconstructability of each signal component may be determined by comparing its SNR or power to a threshold value. The signal component is deemed to have a sufficient reconstructability when its SNR or power exceeds or is equal to the threshold value. The signal component is considered as having an insufficient reconstructability when its SNR or power is less than the threshold value. The present solution is not limited to the particulars of this example.

The results of these determinations made in 1016 are used in 1018 to select switches from a first set of switches (e.g., switches 510, 522, 534, 546, 556 of FIG. 5) that are to be closed during subsequent signal extraction operations. More specifically, each switch that is associated with a signal extractor to which a signal component with a sufficient reconstructability has been assigned is selected in 1018. For example, as shown in FIG. 8, switches 510, 522, 534, 546, 556 are all selected. In contrast, as shown in FIG. 9, switches 546 and 556 were not selected. The present solution is not limited to the particulars of these examples.

Upon completing 1018, the signal extraction operations begin in 1020. In this regard, the received signal (e.g., signal R in FIG. 5) is provided to a first signal extractor (e.g., signal extractor 504 of FIG. 5). At the first signal extractor, a first signal component is extracted from the received signal using soft symbol estimation. The first signal extractor implements a probabilistic approach to estimate soft symbols. The soft symbols are estimated by calculating the probability of each of the symbols being present in the first signal component. From these estimations, the first signal extractor computes a soft symbol which is used to rebuild the first signal component via modulation.

In 1024, a first switch (e.g., switch 510 of FIG. 5) is closed so that the first signal component is provided to a first combiner (e.g., combiner 508 of FIG. 5). The present solution is not limited to the order of 1022 and 1024. Closure of the switch can occur before (e.g., before 1020 and/or 1022) or subsequent (as shown) to the first signal component's extraction from the received signal. The first signal component is removed from the received signal in 1026 by the combiner to produce a cleaned signal (e.g., signal R1-S1 of FIG. 8A). Thereafter, method 1000 continues with 1028 of FIG. 10B.

Figure 10B:
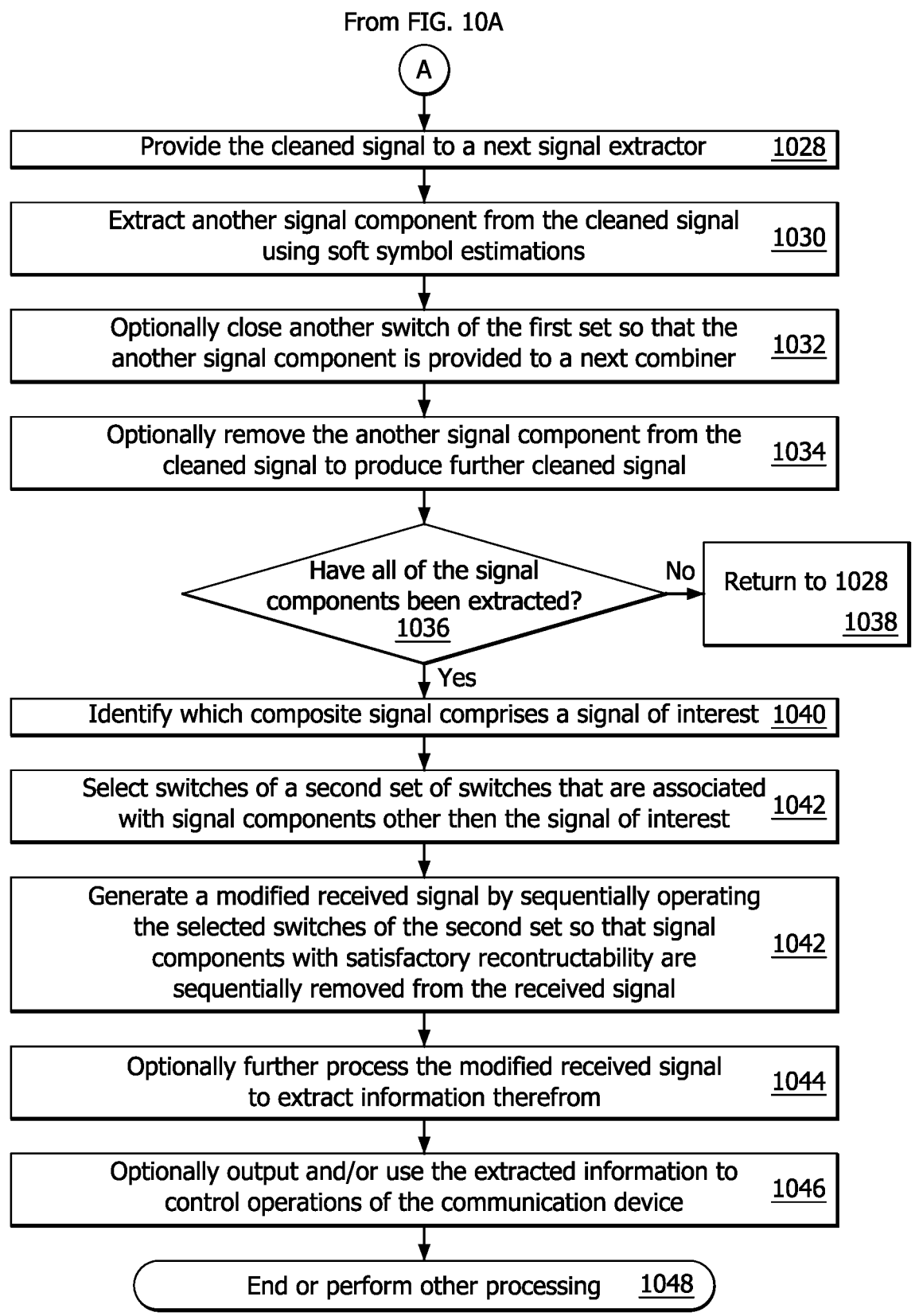

As shown in FIG. 10B, 1028 involves providing the cleaned signal to a next signal extractor (e.g., signal extractor 516 of FIG. 5). This signal extractor performs operations to extract another signal component (e.g., signal component S2 of FIG. 5) from the cleaned signal using soft symbol estimations. The signal extractor of 1028-1030 is the same as or similar to the signal extractor of 1020-1022. A shown by 1032-1034, optional operations may be performed by the system. These optional operations involve: closing another switch (e.g., switch 522 of FIG. 5) of the first set so that the another signal component is provided to a next combiner (e.g., combiner 520 of FIG. 5); and removing the another signal component from the cleaned signal to produce a further cleaned signal.

A determination is then made as to whether all of the signal components have been extracted from the received signal. If not [1036: NO], then method 1000 returns to 1028 as shown by 1038.

If so [1036: YES], then method 1000 continues with 1040 where one of the signal components (e.g., signal component S2 of FIG. 5) is identified as a signal component comprising the SOI. In 1042, switches of a second set of switches (e.g., 550, 552, 554, 556, 558 of FIG. 5) are selected based on the identification made in 1040. The selected switches include those (e.g., switches 550, 554, 556, 558 of FIG. 5) that are associated with signal components other than the signal component comprising the SOI.

A modified received signal (e.g., signal R' of FIG. 5, FIG. 8J or FIG. 9B) is generated in 1042. The modified received signal is generated by sequentially operating the switches of the second set which were selected in 1042 so that signal components with satisfactory reconstructability are sequentially removed from the received signal (e.g., as shown in FIGS. 8F-8J). The modified received signal may be optionally further processed in 1044 to extract information therefrom (e.g., via demodulator 414 of FIG. 4). The extracted information can be output from the communication device (e.g., via display 308 of FIG. 3 and/or I/O device(s) 310 of FIG. 3) and/or used to control operations of the communication device (e.g., to tune to a particular channel, select a particular talkgroup, and/or configure/reconfigure radio parameters or settings). Subsequently, 1048 is performed where method 1000 ends or other operations are performed (e.g., return to 1002 of FIG. 10A).

Figure 11:
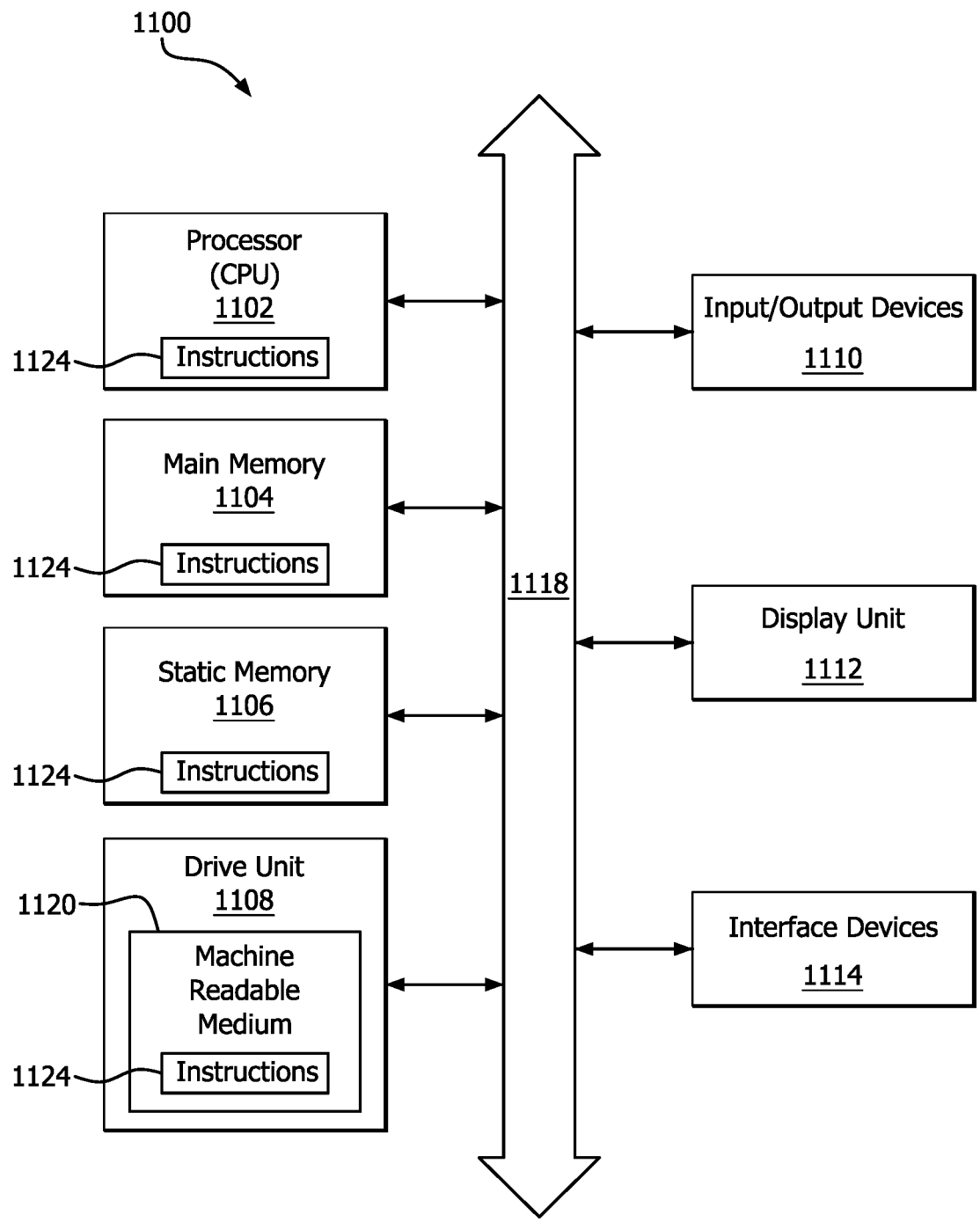
FIG. 11 provides an illustration of an architecture for a computing device.

Referring now to FIG. 11, there is shown a hardware block diagram comprising an example computer system 1100 that can be used for implementing all or part of the interference cancellation device 412 of FIG. 4. The machine can include a set of instructions which are used to cause the circuit/computer system to perform any one or more of the methodologies discussed herein. While only a single machine is illustrated in FIG. 11, it should be understood that in other scenarios the system can be taken to involve any collection of machines that individually or jointly execute one or more sets of instructions as described herein.

The computer system 1100 is comprised of a processor 1102 (e.g., a Central Processing Unit (CPU)), a main memory 1104, a static memory 1106, a drive unit 1108 for mass data storage and comprised of machine readable media 1120, input/output devices 1110, a display unit 1112 (e.g., a Liquid Crystal Display (LCD) or a solid state display, and one or more interface devices 1114. Communications among these various components can be facilitated by means of a data bus 1118. One or more sets of instructions 1124 can be stored completely or partially in one or more of the main memory 1104, static memory 1106, and drive unit 1108. The instructions can also reside within the processor 1102 during execution thereof by the computer system. The input/output devices 1110 can include a keyboard, a multi-touch surface (e.g. a touchscreen) and so on. The interface device(s) 1114 can be comprised of hardware components and software or firmware to facilitate an interface to external circuitry. For example, in some scenarios, the interface devices 1114 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1108 can comprise a machine readable medium 1120 on which is stored one or more sets of instructions 1124 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1100 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for mitigating an effect of interference, comprising:
   receiving, by a device, a signal comprising a plurality of signal components;
   determining, by the device, whether each said signal component has a sufficient reconstructability;
   selecting switches from a first set of switches based on results of said determining;
   closing the selected switches of the first set to generate clean signals each with one or more of the said signal components removed from the received signal;
   reconstructing each said signal component that was determined to have sufficient reconstructability using the received signal or a respective one of the clean signals which has at least one other said signal component removed from the received signal; and
   using at least some of the reconstructed signal components to generate a modified received signal that comprises the received signal with the signal components removed therefrom that (i) are devoid of any signal of interest components and (ii) have sufficient reconstructability.

2. The method according to claim 1, further comprising obtaining power levels for each signal component of the plurality of signal components.

3. The method according to claim 2, further comprising ranking the plurality of signal components based on the power levels.

4. The method according to claim 3, further comprising assigning the plurality of signal components to a plurality of signal extractors based on the ranking.

5. The method according to claim 1, further comprising: obtaining power levels and bandwidth for each said signal component; ranking the plurality of signal components based on power-spectra density levels; and assigning the plurality of signal components to a plurality of signal extractors based on the ranking.

6. The method according to claim 1, wherein a sufficiency of reconstructability for each said signal component is determined based on at least one of a signal-to-noise ratio, a signal power and a modulation type.

7. The method according to claim 6, wherein each said signal component is determined to have sufficient reconstructability when the signal-to-noise ratio or the signal power is greater than a threshold value.

8. The method according to claim 6, wherein each said signal component is determined to have insufficient reconstructability when the signal-to-noise ratio or the signal power is less than a threshold value.

9. The method according to claim 1, wherein the at least one of other signal component is removed from the received signal using soft symbol estimations.

10. The method according to claim 1, wherein at least one other signal component comprises the signal of interest.

11. A method for mitigating an effect of interference, comprising:
   receiving, by a device, a signal comprising a plurality of signal components;
   determining, by the device, whether each said signal component has a sufficient reconstructability;
   selecting switches from a first set of switches based on results of said determining;
   reconstructing each said signal component that was determined to have sufficient reconstructability using the received signal or an at least partially clean signal with at least one other said signal component removed from the received signal; and
   using at least some of the reconstructed signal components to generate a modified received signal that comprises the received signal with the signal components removed therefrom that (i) are devoid of any signal of interest components and (ii) have sufficient reconstructability;
   wherein the reconstructing further comprises sequentially closing the selected switches of the first set so that each said signal component is reconstructed from the received signal or the at least partially clean signal.

12. The method according to claim 11, further comprising selecting switches of a second set of switches based on which signal component comprises the signal of interest.

13. The method according to claim 12, wherein the selected switches of the second set are associated with said signal components other than the signal component comprising the signal of interest.

14. The method according to claim 12, wherein the modified signal is generated by sequentially closing the selected switches of the second set of switches.

15. A system, comprising:
   a processor;
   a non-transitory computer-readable storage medium comprising programming instructions that are configured to cause the processor to implement a method for mitigating an effect of interference, wherein the programming instructions comprise instructions to:
   receive a signal comprising a plurality of signal components;
   determine whether each said signal component has a sufficient reconstructability;
   select switches from a first set of switches based on which ones of the signal components are determined to have sufficient reconstructability;
   cause closure of the selected switches of the first set so that clean signals are generated, each said clean signal having one or more of the said signal components removed from the received signal;
   reconstruct each said signal component that was determined to have sufficient reconstructability using the received signal or a respective one of the clean signals which has at least one other said signal component removed from the received signal; and
   use at least some of the reconstructed signal components to generate a modified received signal comprising the received signal with the signal components removed therefrom that (i) are devoid of any signal of interest components and (ii) have sufficient reconstructability.

16. The system according to claim 15, wherein the programming instructions further comprise instructions to obtain power levels for each signal component of the plurality of signal components.

17. The system according to claim 16, wherein the programming instructions further comprise instructions to rank the plurality of signal components based on the power levels.

18. The system according to claim 17, wherein the programming instructions further comprise instructions to assign the plurality of signal components to a plurality of signal extractors based on the ranking.

19. The system according to claim 15, wherein the programming instructions further comprise instructions to: obtain power levels and bandwidth for each said signal component; rank the plurality of signal components based on power-spectra density levels; and assigning the plurality of signal components to a plurality of signal extractors based on the ranking.

20. The system according to claim 15, wherein a sufficiency of reconstructability for each said signal component is determined based on at least one of a signal-to-noise ratio, a signal power and a modulation type.

21. The system according to claim 20, wherein each said signal component is determined to have sufficient reconstructability when the signal-to-noise ratio or the signal power is greater than a threshold value.

22. The system according to claim 20, wherein each said signal component is determined to have insufficient reconstructability when the signal-to-noise ratio or the signal power is less than a threshold value.

23. The system according to claim 15, wherein the at least one other signal component is removed from the received signal using soft symbol estimations.

24. The system according to claim 15, wherein the at least one other signal component comprises the signal of interest.

25. A system, comprising:
a processor;
a non-transitory computer-readable storage medium comprising programming instructions that are configured to cause the processor to implement a method for mitigating an effect of interference, wherein the programming instructions comprise instructions to:
receive a signal comprising a plurality of signal components;
determine whether each said signal component has a sufficient reconstructability;
select switches from a first set of switches based on which said signal components were determined to have sufficient reconstructability;
reconstruct each said signal component that was determined to have sufficient reconstructability using the received signal or an at least partially clean signal with at least one other said signal component removed from the received signal; and
use at least some of the reconstructed signal components to generate a modified received signal comprising the received signal with the signal components removed therefrom that (i) are devoid of any signal of interest components and (ii) have sufficient reconstructability;
wherein the programming instructions further comprise instructions to cause the selected switches of the first set to be sequentially closed so that each said signal component is reconstructed from the received signal or the at least partially clean signal.

26. The system according to claim 25, wherein the programming instructions further comprise instructions to select switches of a second set of switches based on which signal component comprises the signal of interest.

27. The system according to claim 26, wherein the selected switches of the second set are associated with said signal components other than the signal component comprising the signal of interest.

28. The system according to claim 27, wherein the modified signal is generated by sequentially closing the selected switches of the second set of switches.

* * * * *